(12) United States Patent
Lin

(10) Patent No.: US 11,250,091 B2
(45) Date of Patent: Feb. 15, 2022

(54) SYSTEM AND METHOD FOR EXTRACTING INFORMATION AND RETRIEVING CONTACT INFORMATION USING THE SAME

(71) Applicant: Kaicheng Steve Lin, Santa Clara, CA (US)

(72) Inventor: Kaicheng Steve Lin, Santa Clara, CA (US)

(*) Notice: Subject to any disclaimer, the term of this patent is extended or adjusted under 35 U.S.C. 154(b) by 211 days.

(21) Appl. No.: 16/110,754

(22) Filed: Aug. 23, 2018

(65) Prior Publication Data

US 2020/0065423 A1 Feb. 27, 2020

(51) Int. Cl.
*G06F 16/955* (2019.01)
*G06K 9/00* (2022.01)
*G06F 16/22* (2019.01)
*G06F 3/0484* (2022.01)

(52) U.S. Cl.
CPC ............ *G06F 16/955* (2019.01); *G06F 16/22* (2019.01); *G06K 9/00409* (2013.01); *G06K 9/00456* (2013.01); *G06F 3/0484* (2013.01)

(58) Field of Classification Search
None
See application file for complete search history.

(56) References Cited

U.S. PATENT DOCUMENTS

| 7,051,086 | B2 | 5/2006 | Rhoads et al. | |
| 7,058,652 | B2* | 6/2006 | Czarnecki | G06F 16/951 |
| 7,925,620 | B1 | 4/2011 | Yoon | |

(Continued)

FOREIGN PATENT DOCUMENTS

| CN | 1630302 A | 6/2005 |
| CN | 102231188 A | 11/2011 |

(Continued)

OTHER PUBLICATIONS

Office Action for related Taiwanese Patent Application No. 107146790, dated Oct. 22, 2019; English translation provided (20 pages).

(Continued)

*Primary Examiner* — Alford W Kindred
*Assistant Examiner* — Cao D Vuong
(74) *Attorney, Agent, or Firm* — Procopio, Cory, Hargreaves & Savitch LLP

(57) ABSTRACT

A method and system for managing and retrieving contact information included on a plurality of business cards from a plurality of contacts of a user. The method may, for a given business card corresponding to a given contact of the user, obtain from the business card a unique identifier and a registered phone number corresponding to the contact; determine the unique identifier is associated with the registered phone number to verify the contact has been registered with a contact management server, wherein the contact management server stores contact information of the contact in association with a contact identifier comprising the registered phone number; in response to said determining, generating a record locator comprising the registered phone number and retrieving, from the contact management server, the contact information based on locating the contact identifier; and storing the retrieved contact information.

22 Claims, 12 Drawing Sheets

(56) References Cited

U.S. PATENT DOCUMENTS

| | | | |
|---|---|---|---|
| 8,108,240 B2 | 1/2012 | Gropper | |
| 8,573,499 B1 | 11/2013 | Boyle | |
| 8,856,676 B1* | 10/2014 | Starenky | G06F 40/174 |
| | | | 715/780 |
| 9,058,397 B1 | 6/2015 | Boyle | |
| 9,165,406 B1* | 10/2015 | Gray | G06K 9/00456 |
| 9,706,346 B2 | 7/2017 | Rivard et al. | |
| 2001/0027472 A1 | 10/2001 | Guan | |
| 2001/0032251 A1* | 10/2001 | Rhoads | G07D 7/0034 |
| | | | 709/217 |
| 2002/0035629 A1* | 3/2002 | Sullo | G06Q 10/10 |
| | | | 709/225 |
| 2003/0019935 A1 | 1/2003 | Giannulli | |
| 2006/0112014 A1 | 5/2006 | Azeem | |
| 2007/0102521 A1 | 5/2007 | Petersson | |
| 2007/0158411 A1 | 7/2007 | Krieg | |
| 2008/0189293 A1 | 8/2008 | Strandel et al. | |
| 2011/0173298 A1* | 7/2011 | Nam | G06Q 10/10 |
| | | | 709/219 |
| 2013/0060868 A1* | 3/2013 | Davis | G06Q 50/01 |
| | | | 709/206 |
| 2013/0191402 A1 | 7/2013 | Wilkins et al. | |
| 2014/0172784 A1 | 6/2014 | Choi et al. | |
| 2017/0064035 A1* | 3/2017 | Lai | H04L 67/30 |
| 2017/0192950 A1* | 7/2017 | Gaither | G06F 3/0484 |

FOREIGN PATENT DOCUMENTS

| | | |
|---|---|---|
| CN | 106412056 A | 2/2017 |
| CN | 107403140 A | 11/2017 |
| KR | 20020091720 A | 12/2002 |
| KR | 100498346 B1 | 7/2005 |
| KR | 2015120119 A | 10/2015 |
| TW | 201342087 A | 10/2016 |
| WO | 2001022347 A1 | 3/2001 |
| WO | 2013004036 A1 | 1/2013 |
| WO | 2014089687 A1 | 6/2014 |
| WO | 2015160126 A1 | 10/2015 |
| WO | 2017040406 A1 | 3/2017 |

OTHER PUBLICATIONS

Wright, Guy "Bleamcard brings your standard business card to life" ITProPortal, Jun. 11, 2014; 1 page; https://www.itproportal.com/2014/06/11/bleamcard-brings-your-standard-business-card-to-life/.

"Bleamcard: The Smart Business Card" https://www.indiegogo.com/projects/bleamcard-the-smart-business-card#/.

"World Card" http://www.worldcardteam.com/en/; website retrieved on Aug. 22, 2018; 3 pages.

Hirosan "Extracting Information From Business Card With Google Api" Ahogrammer, Nov. 29, 2016; 4 pages.

"1Card" http://1card.in/#intro-section website retrieved on Aug. 22, 2018; 3 pages.

Perez, Sarah "Microsoft Pix can scan business cards to your contacts, find people on LinkedIn" TechCrunch, Mar. 9, 2018; 3 pages; https://techcrunch.com/2018/03/09/microsoft-pix-can-scan-business-cards-to-your-contacts-find-people-on-linkedin/.

"Camcard" https://www.camcard.com/; website retrieved on Aug. 22, 2018; 2 pages.

"Cardiris™ 5" http://www.irislink.com/EN-US/c1214/Cardiris-5--Business-Card-Software.aspx; website retrieved on Aug. 22, 2018; 2 pages.

"L-Card Pro" https://lcardapp.com/pro/; website retrieved on Aug. 22, 2018; 6 pages.

"iBiz Cloud Business Card" http://idolmemory.com/usb_BC390900ibiz.html; website retrieved on Aug. 22, 2018; 2 pages.

* cited by examiner

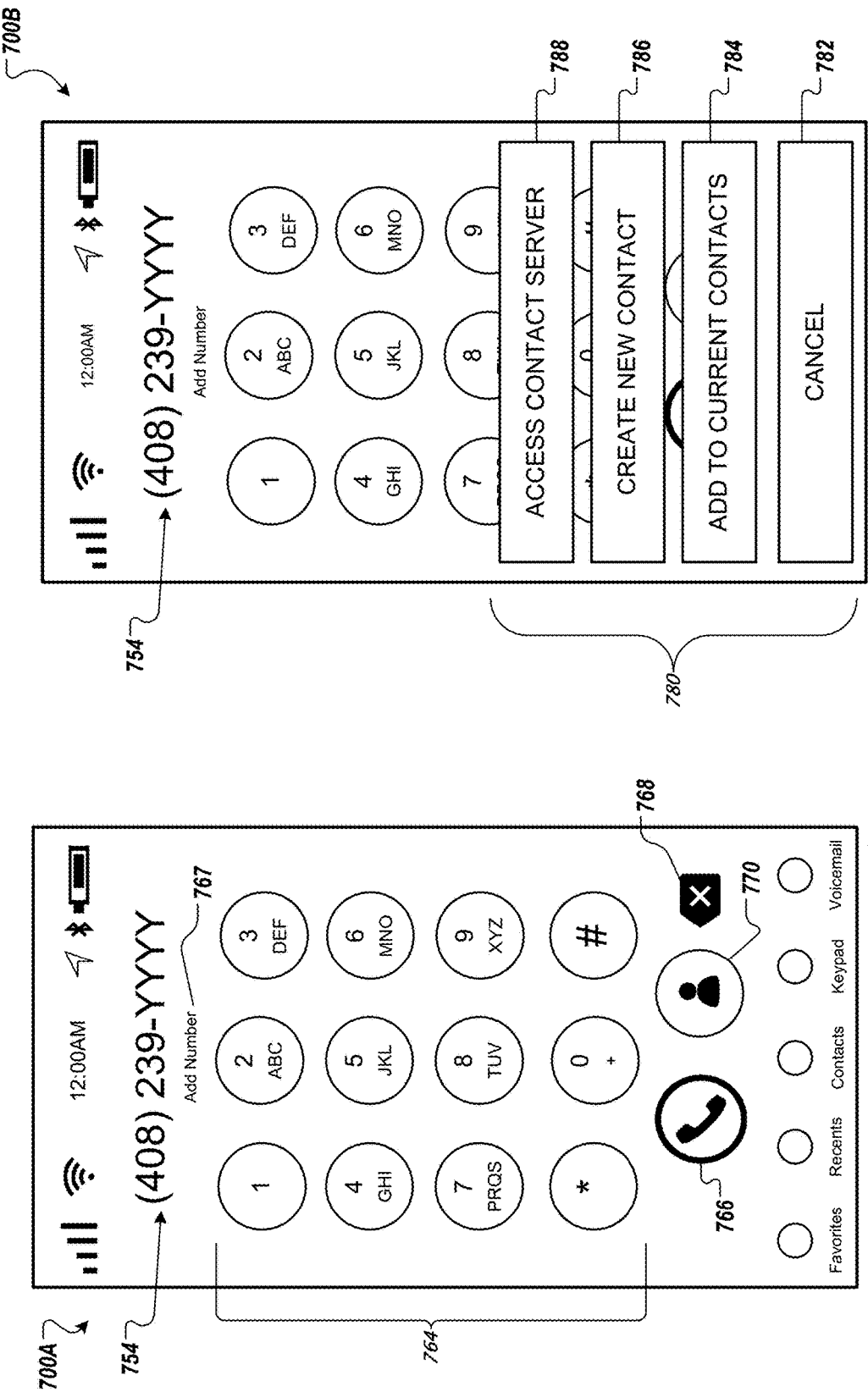

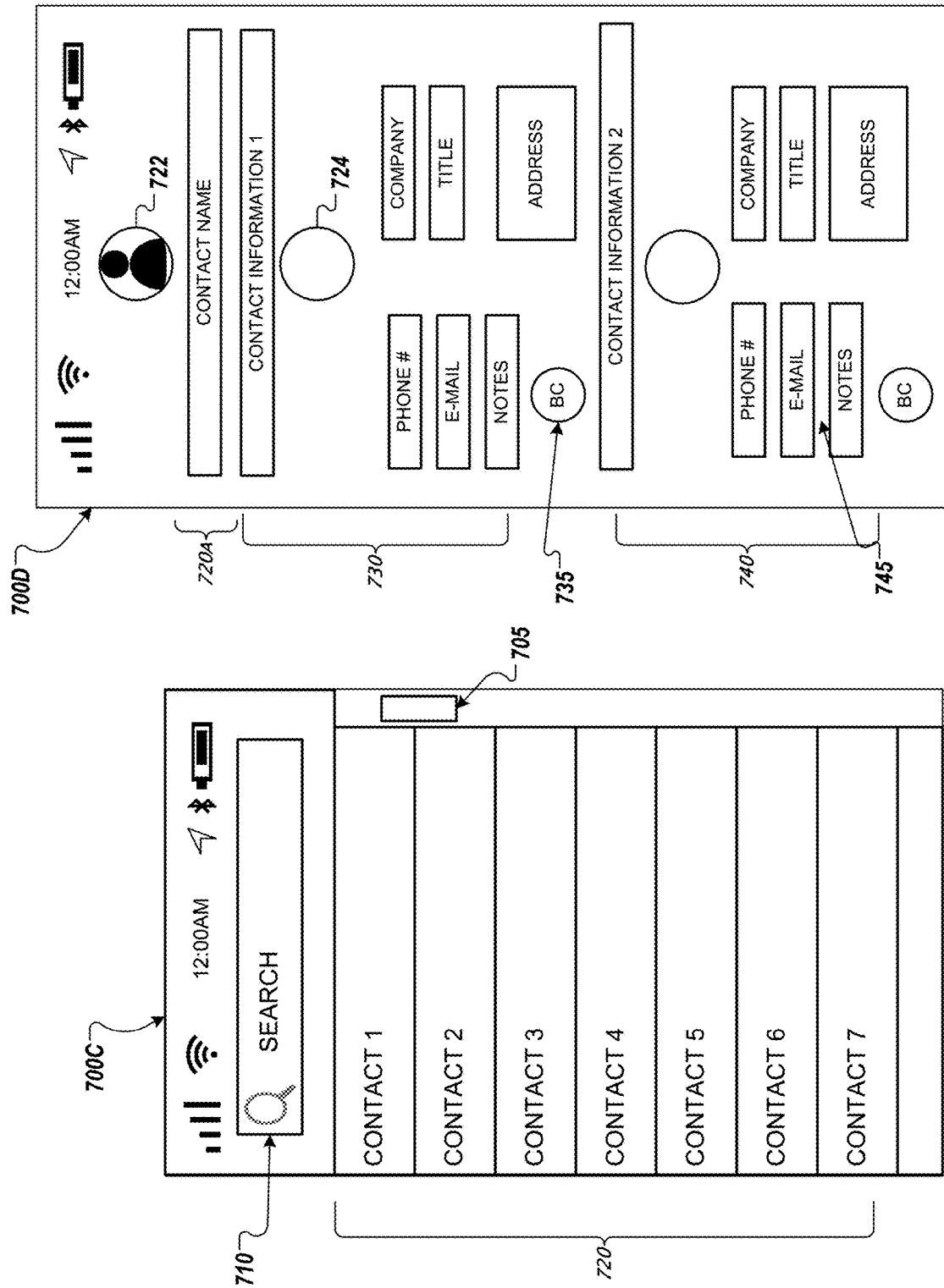

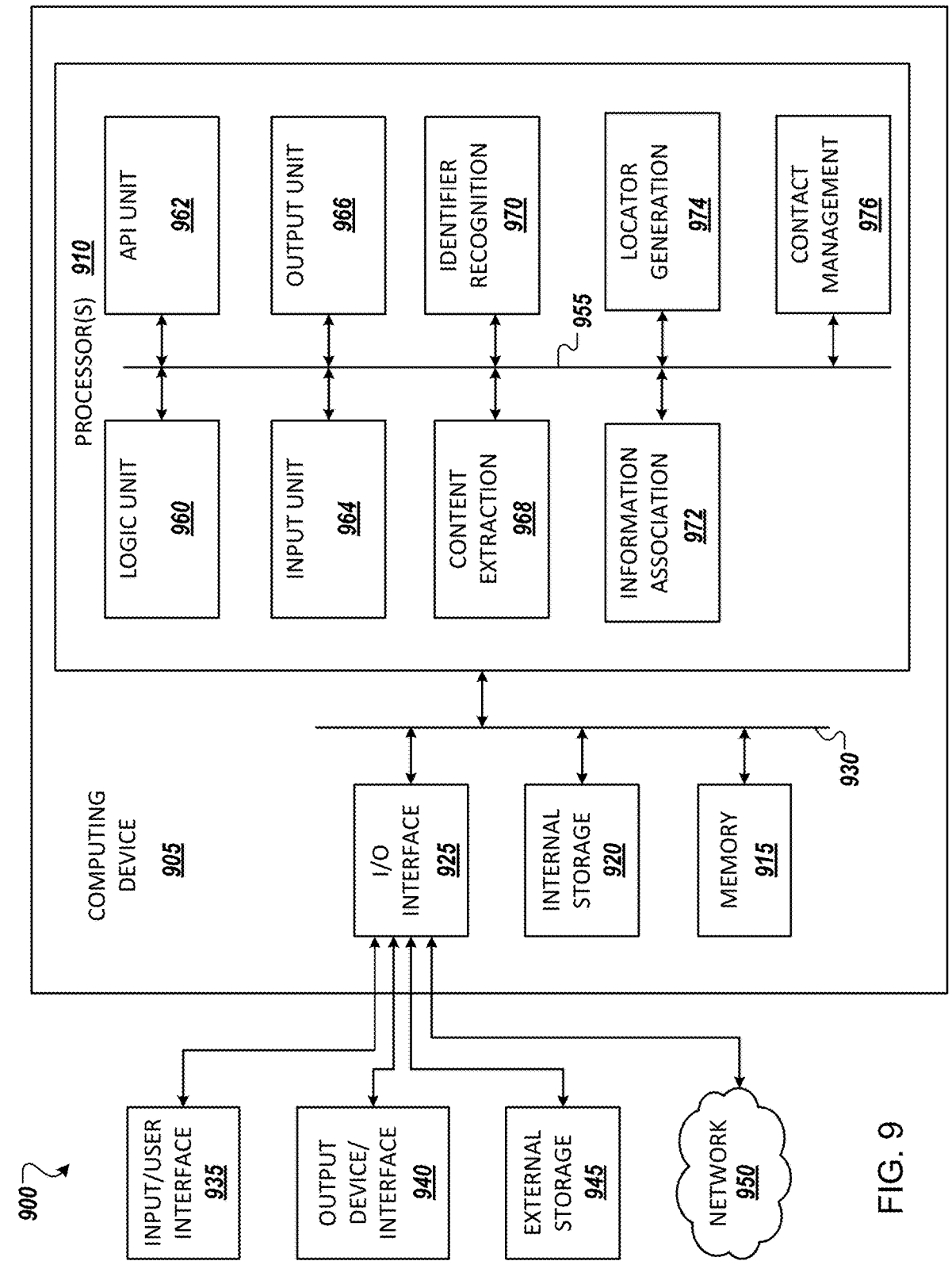

SYSTEM AND METHOD FOR EXTRACTING INFORMATION AND RETRIEVING CONTACT INFORMATION USING THE SAME

BACKGROUND

Field

The present disclosure relates to managing contact information, and more specifically, to systems and methods for identifying a registered phone number associated with content to retrieve contact information using the associated content.

Related Art

Traditionally, individuals involved in personal, commercial or professional activities exchange contact information with their associates. In a typical exchange, parties convey company names, personal names, job titles, telephone numbers, mailing addresses, email addresses, web page addresses and other contact information. The mode of exchange usually includes an exchange of a business card or other stationary including the information printed thereon. In some cases the contact information may be exchanged through other means, such as verbally or in a written communication.

A given individual may receive contact information from numerous personal or professional associates. Accordingly, over the course of the individual's personal and professional experiences, he/she would collect information related to any number of associates. To manage the sheer number of contacts, the individual would be required to implement an organization method for managing the numerous physical business cards or stationary. In the event that the information is verbally provided, the individual would also have the record and physically store and organize this information along with any other contact information received. Traditionally, people have would store their collection of contact information in business card recorded and organized contact information manually by entering contact information into an address book, or by affixing a business card or a contact entry to a record keeping system. For example, many email programs and operating systems include a contact entry system whereby an individual may enter and manage each contact.

However, manually entering each piece of information into a local contact entry system can be time consuming. Further, associates may change occupations, companies, phone numbers, emails, and other contact information and personal details over the course of their professional and personal experiences. When this occurs, it falls on the individual to manually update and manage these changes. Similarly, a given associate may be associated with different companies or groups, thereby having multiple business cards and/or means of contact that are not always directly connected (e.g., the associate may have multiple business cards that do not refer to each other). Thus, the individual would be required to manage separate entries in their contact entry system or retain multiple business cards for the same contact.

Some existing systems may provide some level of contact information management by linking information stored in a database to a feature that is specifically designed for providing such access. For example, some implementations require a user to register online and, after registering, receive pre-printed business cards having steganographically-embedded features integrated into the business card. Such systems rely on outputting and decoding data from the stregnographically-embedded feature to retrieve information from an on-line database. Other systems utilize a unique serial number generated to correspond to a registered user, who may provide the serial number to other users for accessing the information. Some other existing systems store contact information and permit access to the information via a unique machine readable code (e.g., QR code). However, these existing systems require the use of specifically designed features, serial numbers, and/or codes that meet specific requirements for managing and accessing information of an individual's associates. Third party users must remember these features or otherwise retain the business cards that include the features to maintain access to the information. Example implementations of the present application may address these deficiencies.

SUMMARY OF THE DISCLOSURE

Aspects of the present application may relate to a method for managing and retrieving contact information included on a plurality of business cards from a plurality of contacts of a user. The method may include, for a given business card of the plurality of business cards that corresponds to a given contact of the user, obtaining, by a device of the user, at least a unique identifier and a registered phone number corresponding to the contact and from the business card, and determining the obtained unique identifier is associated with the registered phone number to verify the contact corresponding to the business card has been registered with a contact management server based on the unique identifier, wherein the contact management server comprises a database that stores contact information of the contact in association with a contact identifier comprising the registered phone number. The method also includes, in response to said determining, generating a record locator comprising the registered phone number and retrieving, from the contact management server, the contact information of the contact based on locating the contact identifier comprising the registered phone number comprised in the record locator, and storing, at the device of the user, the retrieved contact information in association with the obtained registered phone number.

Additional aspects of the present application may relate to a system configured to manage and retrieve contact information included on a plurality of business cards from a plurality of contacts of a user. The system comprises at least one memory storing instructions and at least one processor operably coupled to the memory and configured to execute instructions stored in the memory for performing a process of managing and retrieving contact information included on a plurality of business cards from a plurality of contacts of a user. The process includes, for a given business card of the plurality of business cards that corresponds to a given contact of the user, obtaining, by a device of the user, at least a unique identifier and a registered phone number corresponding to the contact and from the business card and determining the obtained unique identifier is associated with the registered phone number to verify the contact corresponding to the business card has been registered with a contact management server based on the unique identifier, wherein the contact management server comprises a database that stores contact information of the contact in association with a contact identifier comprising the registered phone number. The process also includes in response to said determining, generate a record locator comprising the registered phone number and retrieving, from the contact management server, the contact information of the contact based on locating the contact identifier comprising the registered phone number comprised in the record locator, and store, at the device of the user, the retrieved contact information in association with the obtained registered phone number.

Further aspects of the present application relate to a non-transitory computer readable medium having stored therein a program for making a computer execute a method of managing and retrieving contact information included on a plurality of business cards from a plurality of contacts of a user. The method comprises, for a given business card of the plurality of business cards that corresponds to a given contact of the user, obtaining, by a device of the user, at least a unique identifier and a registered phone number corresponding to the contact and from the business card, and determining the obtained unique identifier is associated with the registered phone number to verify the contact corresponding to the business card has been registered with a contact management server based on the unique identifier, wherein the contact management server comprises a database that stores contact information of the contact in association with a contact identifier comprising the registered phone number. The method also includes in response to said determining, generating a record locator comprising the registered phone number and retrieving, from the contact management server, the contact information of the contact based on locating the contact identifier comprising the registered phone number comprised in the record locator, and storing, at the device of the user, the retrieved contact information in association with the obtained registered phone number.

BRIEF DESCRIPTION OF THE DRAWINGS

FIGS. 7A-7E illustrate graphical user interfaces (GUIs) that may be used to control the system in accordance with an example implementation of the present application.

FIG. 9 illustrates an example computing environment with an example computer device suitable for use in some example implementations of the present application.

DETAILED DESCRIPTION

Figure 1:
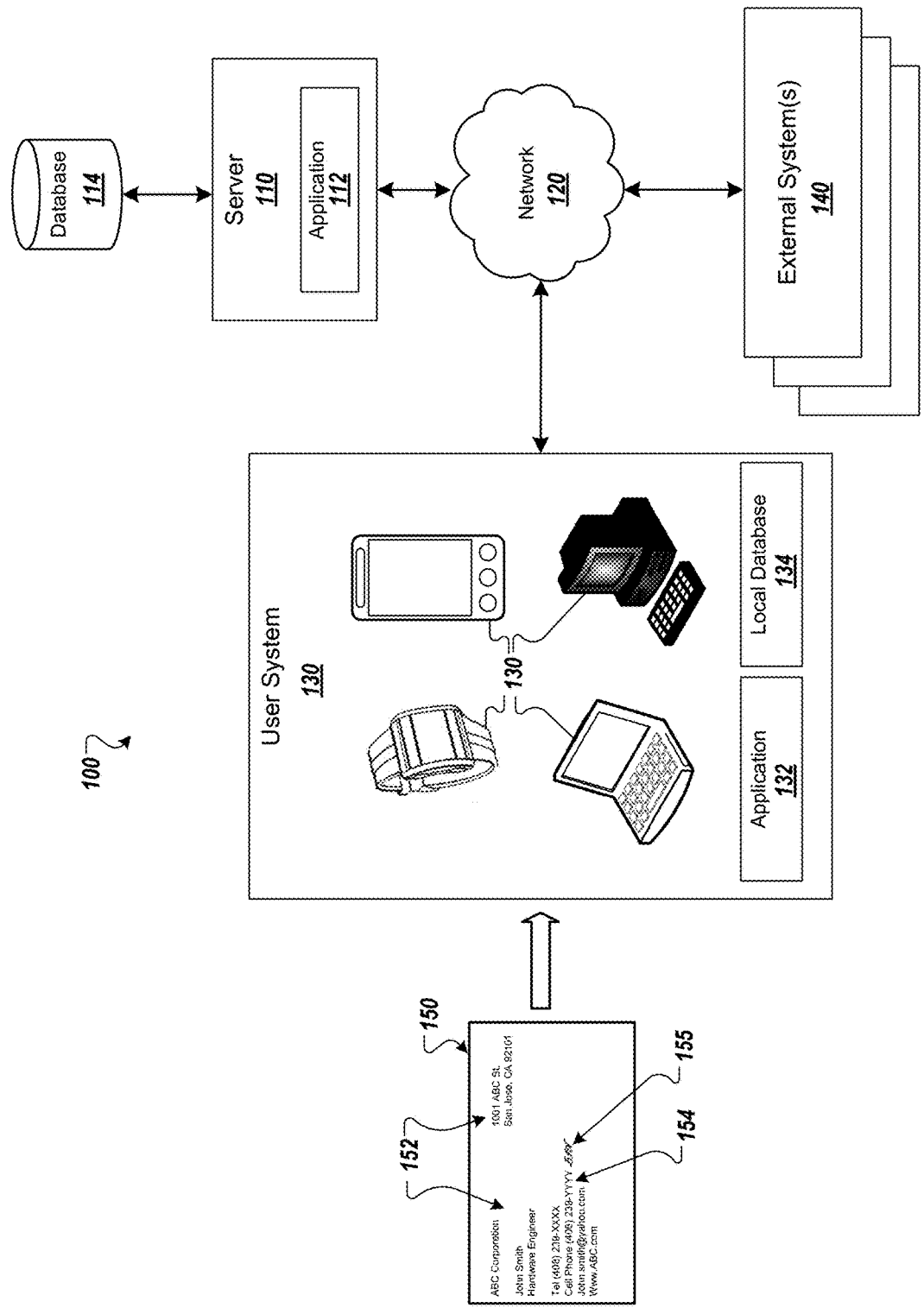
FIG. 1 an example infrastructure, in which one or more of the processes described herein, may be implemented in accordance with an example of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application. Similarly, the various process and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

In the present application, the terms "business card" may be used to refer to any article or object containing one or more or a plurality of pieces of contact information corresponding to the person whom provided the business card. For example, in an exchange of business cards, a person may provide a business card to another person, one which the providing persons contact information is printed or displayed. The phrase business card is not intended to be limiting, but may refer to any stationary, paper, object that includes information printed thereon. In some embodiments, the business card may be digital and thus displays the information using a display. In some embodiments, the contact information may be included in an email, letter or other method of communication, for example, in a letter head, salutations (e.g., signature block), header, and/or footer. Accordingly, it will be appreciated that the term business card is not intended to be limited to a specific items, but may refer to any form of communication that displays contact information.

Further, in the present application the term "contact information" may be used to refer to any information that may be used to contact a person. For example, but not limited to, a person's name(s), professional occupation(s), company or employer(s), title or position of employment(s), business address(es), websites(s), email address(es), and/or registered numerical phone number(s) such as, for example, land-line phone number(s) mobile phone number(s), domestic phone number(s) (e.g., as used herein to refer to US registered numeric phone number(s)), international phone number(s) (e.g., as used herein to refer to non-US registered numeric phone number(s)), etc. Such information may be printed and/or displayed on a business card as textual contact information. A given person may have multiple business cards, containing different information that may or may not match that of their other business cards. Furthermore, in the present application, "textual contact information" may be used to represent descriptive text-based information that may be representative of the contact information included on one or more of the described business cards. Textual contact information may be used herein to refer to textual representations included on the business card itself or as displayed on a screen (e.g., a mobile phone or other display device).

In this present application the terms "user", "recipient" or the like may be used interchangeably to represent a person involved in an exchange of contact information with another person, such as an associate, business contact, personal contact, commercial contact or the like. Such contacts may be friends, acquaintances, co-workers, bosses, employees, or any person that the individual may come into contact with during certain activities. Further, in the present application the terms "contact", "business contact", "associate" or the like may all be used interchangeably to represent a those whom the individual exchanges contact information with. As used herein, the individual may refer to the person receiving a business card and/or contact information, and the contact may refer to the person providing the business card and/or contact information. However, it will be appreciated that the roles may be reversed, such that the contact may receive a business card from the individual at the same time or at a later or earlier time.

In the present application, the terms "data", "image" or "image data" may be used interchangeably to describe one or more of a photo, a video, a three-dimensional or 360° image recording, a computer-generated image, or any other visual representation that may be produced, captured or may otherwise represent an event or occurrence in the real world. These terms may also include a recording or other audio or audio data representation that may be produced, captured, or may otherwise represent the event or occurrence in the real world. In some embodiments such audio data may be part of a voice activated or voice command data entry. Additionally, the term "inputted data", "text entry(ies)", or "data entry(ies)" or the like may be used interchangeable to described received data inputs of textual based information. For example, but not limited to, a name, phone number, email address, website address, physical geographical address, company information, etc. The "data", "image", "image data", "audio" or "audio data" may be captured by any media capture device including, but not limited to, a camera, a digital recorder, analog recorder, mobile communications device, or any other media capture device that may be apparent to a person of ordinary skill in the art. In some embodiments, the term image or image data may refer to a representation of a business card using pixel data and/or other image data structure. Similarly, the business card may be represented as an audio recording, whereby a user has verbally read the contact information from a business card into a recorded. The "data", "image", "image data", "audio" or "audio data" or other inputted data may be stored as a data file or other data structure on a computer readable medium including but not limited to a magnetic storage device, an optical storage device, a solid state storage device, an organic storage device or any other storage device that may be apparent to a person of ordinary skill in the art. Further, the computer readable medium may include a local storage device, a cloud-based storage device, a remotely located server, or any other storage device that may be apparent to a person of ordinary skill in the art.

In accordance with example implementations of the present application, an individual may register and store contact information in a remote database. The individual may register using any phone number, whereby a registered phone number is associated with a record of individual in the database that comprises a plurality of contact information. The individual may then provide his/her registered phone number to others by providing at least the registered phone number and a unique identifier (sometimes interchangeably referred to herein as "symbol") in association with the registered phone number. Providing the contact information may include providing any object that displays the registered phone number as textual contact information, for example, by publishing and handing out business cards, sending communications including contact information (e.g., in a signature block or closing at the end of an email), distributing flyers or bulletin board posts, or any form of displaying the information. The individual may simply include the unique identified as, for example, a symbol in association with the registered phone number, thereby indicating to recipients that the individual is registered with the database and that the recipients may use the associated phone number to access and/or retrieve the individual's contact information form the database.

For example, an individual may register with a contact management server and/or database using a phone number (e.g., a mobile phone number or other phone number). The user may also have business cards printed that include the phone number along with other contact information. A symbol may be included on the business card when printed and/or may be added after printing by the individual (e.g., via other printing procedure, stamp, handwritten, or the otherwise). The symbol may be visibly included such that other persons and/or imaging techniques may recognize or otherwise identify the symbol. The symbol may be a standardized or common symbol for each business card and each contact, such that it is instantly recognized by either the user or a device of the user that the phone number associated with the symbol is registered with the contact management server. The symbol can be positioned such that an association can be determined between the symbol and the phone number. For example, the position of the symbol relative to the phone number may indicate an association. The association may be used to indicate that the phone number can be used by other persons or devices to retrieve contact information about the individual from the database.

The other persons (e.g., a user), after receiving a business card having textual contact information thereon of an individual, may use the registered phone number to locate the providing contact in the database and retrieve contact information associated there with. For example, by associating the symbol with a registered phone number, the user may be able to recognize or identify the piece of contact information that may be used to access contact information in the contact management server associated with the contact that provided the business card.

The specific information stored in the database may be entered by the contact during registration and/or by the user with reference to the business card. Thus, the database may be actively and dynamically updated. Furthermore, embodiments herein may provide other advantages, such as permitting the user to acquire numerous business cards, each which may include a symbol associated with a corresponding registered phone number. Thus, the user may be able to retrieve and manage his/her contacts simply by referencing the associated registered phone number, which may be updated over time without the need of a new business card. Additionally, business cards may include a limited amount of textual contact information that pertains to the specific business card. Whereas, the database may store additional information associated with the contact that need not be limited to textual information presented on the business card. For example, a picture of the contact, a logo, alternative business and/or endeavors, other forms of contact methods, additional addresses, websites, etc. Further still, a given contact may correspond to multiple business cards and/or contact information. Each may be stored in the database associated with the registered phone number. Thus, a user having a single business card corresponding to a given contact may be able to access multiple business cards and/or contact information.

In some embodiments, a user may be able to access a contact's business card and/or contact information by simply entering a phone number into a search menu and/or a dialing interface. Similarly, the user may access a list of phone numbers saved in a device (e.g., a mobile phone), including one or more phone numbers of a registered contact (e.g., having a symbol associated therewith). By entering the phone number of the contact in to a device or selecting the phone number, the user can obtain and display other contact information associated with the first user.

In accordance with some example implementations of the present application, an application may be provided that is executed by a mobile device that allows a user to enter the phone number and retrieve contact information of contacts. In some embodiments, the user may enter a phone number (e.g., via a dialing interface) of a contact in order to retrieve and store the contact information in the device. In some embodiments, the user may be able to update and/or otherwise save information from the business card into the database, which may or may not need to be verified by the contact. In various embodiments, a camera may be configured to capture an image of a business card. Image processing and recognition techniques may be performed on the image to identify registered phone number and/or the unique identifier and extract the registered phone number. The application may be executed to utilize this information as set forth herein, thereby recognizing the symbol and automatically retrieving and storing the contact information associated therewith. In some embodiments, image processing techniques may be used to determine the association based on the proximity of the phone number to the unique identifier.

In accordance with some example implementations of the present application, embodiments herein may provide an ability to manage contacts based solely on one or more a phone number(s), without requiring additional information to either stored, embedded, generated, or otherwise to access the contact information. In other words, where the registered phone number is associated with a symbol, a user may enter the phone number into a device via, for example, a dialing interface. The device may then display the phone number as well as the associated contact and any contact information that is associated with the contact. In some embodiments, an icon or virtual button may be generated by the application that the user may interact with (e.g., press, swipe, voice command, etc.), which may cause the application to retrieve the contact information and/or generate an image of the business card or plurality of business cards associated with the contact.

The embodiments herein provide numerous advantages over existing systems. For example, each contact may be associated with a given piece or pieces of contact information. It may be advantageous to utilize a static (e.g., unchanging) contact information. For example, many people have multiple email addresses, multiple business cards, or various ways to contact them that may change overtime. Furthermore, multiple people may be associated with any given address. However, most people may only have a single phone number (e.g., a single mobile number, home number, or other phone number) that is unique to that person and use the single phone number for all uses. By associating the phone number as the away to identify and locate a contact, the identity of a user based on a business card can easily be organized, stored and recalled by others, especially for users who have multiple business cards, plural contact information of email, etc. Further, by using contact information that is displayed on the business card, the individual may be able to print multiple cards, register with the database after that fact, and add the symbol without a need to reprint or order new cards. In some embodiments, the contact information may be types of information traditionally displayed and included in a business card as described above.

Accordingly, various embodiments herein comprise identifying a symbol included on a business card, associating the symbol with a registered phone number on the business card, and locating, retrieving, and storing contact information from a database, wherein the contact information is associated with the contact corresponding to the business card. It should be noted that while a business card printed that includes the symbol, a user may also be able to add the symbol to an existing business card, for example, by stamp, printer, sticker, or even handwritten note. Further, the symbol may be customized so that it is difficult for others to replicate. The symbol may even some other unique symbol that the app can identify as an indicator of the contact phone information. The symbol may be static and common across multiple users and business cards such that the application can instantaneously recognize the symbol, identify the phone number, and retrieve the associated contact information.

FIG. 1 illustrates an example system 100 for managing and retrieving contact information, according to an embodiment. The infrastructure may comprise a platform 110 (e.g., one or more servers and sometimes referred to herein as a server and/or a contact management server) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., websites, apps, other platforms, etc.) via the networks 120.

Network(s) 120 may comprise the Internet, and platform 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. In various embodiments, the network may communicatively coupled to the platform and/or user systems 130 through standard communication network protocols, such as, but not limited to, Bluetooth, LTE 4G, 5G, GSM, CDMA, cellular network protocols and the like.

While platform 110 is illustrated as being connected to various systems through a single network 120, it should be understood that platform 110 may be connected to the various systems via different sets of one or more networks. For example, platform 110 may be connected to a user system 130 and/or external systems 140 via the Internet, but may be connected to one or more other user systems 130 and/or external systems 140 via an intranet. Furthermore, while only a single user system 130 and external systems 140 are illustrated, it should be understood that the infrastructure may comprise any number of user systems, server applications, and databases.

As illustrated in FIG. 1, user system 130 may comprise any type or types of computing devices capable of wired and/or wireless communication, including without limitation, desktop computers, laptop computers, tablet computers, smart phones or other mobile phones, wearable smart devices (e.g., smart watches, eyewear, and the like), servers, game consoles, televisions, set-top boxes, electronic kiosks, and the like. As will be described below, the user system 130 may comprise a client application 132 executing on the user system 130 for interacting with the server application 112 to perform one or more of the processes described herein.

The user system 130 may further comprise, be communicatively coupled with, or otherwise have access to one or more local database 134 (e.g., memory or non-transitory computer readable medium storage device as described herein). For example, user system 130 may comprise one or more processes which manage the database 134. A user system 130 may submit data (e.g., user data, contact data, image data, etc.) to be stored in database 134, and/or request access to data stored in database 134.

Platform 110 may comprise web servers which host one or more websites and/or web services. In embodiments in which a website is provided, the website may comprise one or more user interfaces, including, for example, webpages generated in HyperText Markup Language (HTML) or other language. Platform 110 transmits or serves these user interfaces in response to requests from the user system 130. In some embodiments, these user interfaces may be served in the form of a user application interface, in which case two or more user interfaces may be served in a sequential manner, and one or more of the sequential user interfaces may depend on an interaction of the user or user system with one or more preceding user interfaces. An example graphical user interface (GUI) is provided below in FIGS. 6A-7E. The requests to platform 110 and the responses from platform 110, including the interactions with user interfaces, may both be communicated through network 120. These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, contact data, image data, etc.) to be stored in database 114, and/or request access to data stored in database 114. Any suitable database may be utilized, including without limitation MySQL™, Oracle™, IBM™, Microsoft SQL™, Sybase™, Access™, and the like, including cloud-based database instances and proprietary databases. Data may be sent to platform 110, for instance, using the well-known POST request supported by HTTP, via FTP, etc. This data, as well as other requests, may be handled, for example, by server-side web technology, such as a servlet or other software module (e.g., application 112), executed by platform 110.

In embodiments in which a web service is provided, platform 110 may receive requests from the user system 130 (or external system(s)) 140, and provide responses in eXtensible Markup Language (XML) and/or any other suitable or desired format. In such embodiments, platform 110 may provide an application programming interface (API) which defines the manner in which the user system 130 and/or external system(s) 140 may interact with the web service. Thus, user system 130 and/or external system(s) 140 (which may themselves be servers), can define their own user interfaces, and rely on the web service to implement or otherwise provide the backend processes, methods, functionality, storage, etc., described herein. For example, in such an embodiment, a client application 132 executing on the user system 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at the user system 130, while the server application on platform 110 is responsible for generating the webpages and managing database functions. Alternatively, the client application may be "thick," in which case processing is primarily carried out client-side by the user system 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case application 112 performs all processing) or user system 130 (e.g., in which case application 132 performs all processing) or be distributed between platform 110 and user system 130 (e.g., in which case server application 112 and client application 132 both perform processing), can comprise one or more executable software modules that implement one or more of the processes, methods, or functions of the application(s) described herein.

FIG. 1 also illustrates a business card 150 provided to the system in accordance with an example implementation of the present application. Business card 150 may include content displayed thereon, which may include a plurality of contact information represented as textual contact information 152 and a symbol or unique identifier 155. The example illustrated in FIG. 1 depicts a business card 150 that includes textual contact information, including, a company name (e.g., "ABC Corporation"), a contact name ("e.g., John Smith"), an occupation title or position (e.g., "Hardware Engineer"), a land line phone number (e.g., "(408) 239-XXXX"), a mobile phone number (e.g., "(408) 239-YYYY"), an email address ("john.smith@yahoo.com"), and a physical geographical address ("1001 ABC St., San Jose, Calif. 92101") and unique identifier 155 (e.g., "BIN"). The business card 150 may include additional contact information or fewer contact information than that illustrated. However, the business card 150 should include at least a registered phone number 154 and the unique identifier 155. Additionally, the unique identifier 155 is associated with at least the one piece of registered phone number 154 of the textual contact information 152. For example, a mobile phone number 154 as shown in FIG. 1, however any a registered land-line phone number may be associated with the unique identifier.

Thus system 100, according to various embodiments described herein, provides for managing and retrieving contact information from, for example, database 114 and/or local database 134. The contact information may be included in a plurality of business cards (e.g., business card 150) that have been received by a user of the user system 130. For example, a business card 150 may be provided to a user from a contact. The user system 130 may obtain a unique identifier 155 and at least the registered phone number 154 from the business card. For example, via the user entering the information through a user interface as described in connection to FIG. 9 and/or via image processing of an image of the business card 150 as described herein. In some example implementations, obtaining the registered phone number and unique identifier may be provided by a GUI such as graphical user interfaces 600A and 600B illustrated in FIGS. 6A-6B discussed in greater detail below.

According to various embodiments, the user system 130 may determine that the unique identifier 155 is associated with the registered phone number 154. In some embodiments, the user system 130 may determine the association based in part on a position of the unique identifier 155 on the business card 150 in relation to a position of the registered phone number 154. For example, the presence of the unique identifier 155 near the registered phone number 154 may be indicative of the association. In some embodiments, the evaluation may be based on a position of the unique identifier 155 being within or equal to a threshold distance of the registered phone number 154. For example, the threshold hold may be a few millimeters or based on pixel measurements derived from image data. Further still, in some embodiments, the unique identifier 155 may be determined to be associated with the registered phone number 154 when the distance between the unique identifier 155 and the registered phone number 154 is less than the distance between the unique identifier 155 and other textual contact information 152 on the business card. In some embodiments, the registered phone number to which the unique identifier is closest may be associated with the unique identifier 155.

As described above, the unique identifier 155 may be indicative that that contact corresponding to the business card 150 has registered with a contact management server (e.g., server 110). Registration may include sending in one or more contact information for storage in the database 114. The sent contact information may be stored in association with the contact and locatable via an association with a contact identifier. The contact identifier may be and/or comprise the contact information represented by the phone number of the contact. Thus, the database 114 may store contact information corresponding to a contact in association with the at least one textual contact information.

In some embodiments, a record locator may be generated by and transmitted from the user system 130 to the server 110 via the network 120 as executed through the API of the applications 132 and 112. In various embodiments, the generation and transmission may be in response to determining the association between the unique identifier 155 and the registered phone number 154. Furthermore, in some implementations, the record locator may be generated automatically in response to determining the association and automatically followed by requesting retrieval of the contact information associated with the registered phone number 154 by using the record locator. In various embodiments the record locator may comprise the registered phone number 154 and further still may include only the registered phone number 154 with an indicator of where the server 110 is to send the retrieved information.

Upon receipt of the record locator, the server 110 may locate the contact based on a comparison of the record locator with the contact identifiers in the database 114. For example, the server 110 may search the database 114 for a contact identifier comprising a registered phone number that matches the registered phone number 154 of the record locator. The server 110 may then retrieve the contact and associated contact information and send such to the user system 130.

The user system 130 may then store the contact information in database 134 for subsequent access, use, and/or display. For example, the user system 130 may receive an input representative of the registered phone number 154 (e.g., via a dialing interface or other GUI) and identify the contact in the local database 134 (or request the information from database 114) based on the received registered phone number 154. The contact information may be retrieved and subsequently displayed on the user system 130. In some example implementations, entry of and/or searching registered phone numbers may be provided by a GUI such as graphical user interfaces 700A-700E illustrated in FIGS. 7A-7C discussed in greater detail below. For example, the user may have entered a phone number either into a search bar and/or a dialing interface. The user system 130 may locate either contact information stored therein based on the phone number and/or request contact information from the server 110. The request may be performed using a record locator as described above.

Various aspects of example processes and methods are discussed below that may be executed using the system 100 of FIG. 1.

Figure 2:
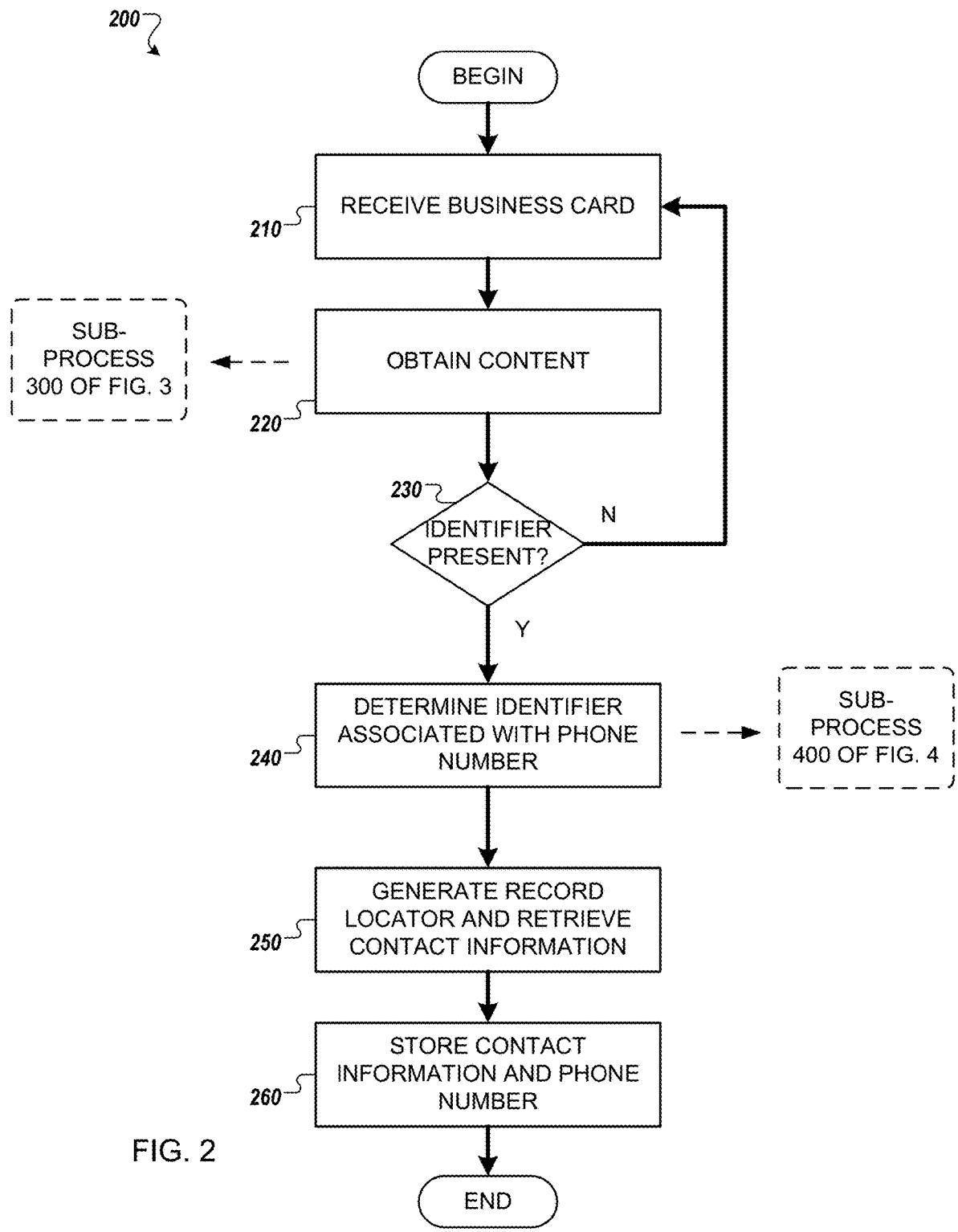
FIG. 2 illustrates another flow chart for managing and retrieving contact information in accordance with an example implementation of the present application.

FIG. 2 illustrates a flow chart of a process 200 for managing and retrieving contact information included on a plurality of business cards from a plurality of contacts of a user in accordance with an example implementation of the present application. The process 200 may be performed by a one or more devices in a networked environment such as the example system 100 illustrated in FIG. 1 discussed above. In some embodiments, the process 200 may be performed by one or more computing device such as example computing device 905 of the example computing environment 900 illustrated in FIG. 9 discussed below. In some embodiments, the computing device 905 may an example of one or more of the server 110, user system 130, and/or external system 140. In some embodiments, the process 200 may be performed by a client (e.g., thin or thick client as described in connection to FIG. 1).

Though the elements of process 200 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

At step 210, one or more business cards are received. For example, the user may receive or otherwise be provided a plurality of business cards by a plurality of contacts. The process 200 may be performed for a given business card of the plurality of business cards corresponding to a contact of the plurality of contacts. In some embodiments, the device (e.g., a mobile device) may receive data representative of the business card, for example, as an image comprising a plurality of pixel data for displaying and processing the content of the business card. In another embodiment, the business card may be received by data entry or input received from the user via a user interface. For example, the user may read textual contact information from the business card and enter it into the device via an alphanumeric keyboard or dialing interface. In another embodiment, the user may utilize voice activation to read the textual contact information in the form of audio data.

Once the business card is received, the content presented on the business card may be obtained at step 220. Content may include any information included on the business card, for example, textual content information and a unique identifier. In some embodiments, step 220 includes obtaining at least the unique identifier and the registered phone number of the business card. Obtaining the registered phone number may include recognizing the multiple pieces of contact information in the form of displayed textual contact information and extracting the information therefrom. Obtaining the registered phone number may include a numeric recognition algorithm that recognizes numerals in the textual contact information and determines that the numerals represent a phone number. In some implementations, where the registered phone number is input by the user and/or read in via voice input, registered phone number may have been entered into defined data fields and stored for subsequent use. In other embodiments, the process 200 may utilize, as described in greater detail below, artificial intelligence and image recognition algorithms to identify what each piece of textual contact information refers too (e.g., a phone number, a name, an email, etc.). In implementations where the business card is represented as an image, the process may use image processing and recognition techniques to identify and extract the registered phone number and unique identifier. An example implementation of step 220 may be performed using a sub-process 300 illustrated below in FIG. 3.

Step 220 may also comprise categorically recognizing a plurality of contact information types of each piece of textual contact information on the business card. The information may be classified according to the type of information (e.g., a phone number, an email address, a name, etc.) for subsequent access and/or use. For example, a device may obtain and/or extract a mobile phone number, telephone number, a contact name, company, physical geographical address, an email address, etc. and a unique identifier (if present). Each piece of textual information may be classified according to the type of information, e.g., phone numbers, addresses, names, etc.

In some embodiments, obtaining the unique identifier may include recognizing a symbol of the business card. The symbol may be an image, feature, or textual content that may be unique to the system and/or common across business cards of the users of the system. In some embodiments, the unique identifier may be pre-determined such that the process may readily identify the unique identifier based on a comparison with a template stored in a database (e.g., databases 134 and/or 114). For example, the unique identifier may be recognized when a match is found between the unique identifier on the business card and the template. In another embodiment, a unique identifier may be obtained when the content does not match a format or criteria of contact information generally included on a business card (e.g., a phone number, name, email address, etc.). Accordingly, the unique identifier need not be pre-determined and may be added to the business card at any time following registration. Once the content is recognized it may be classified as the unique identifier.

In some embodiments, obtaining the registered phone may include recognizing a predictable and predetermined pattern of integers that meet standards and conventions based on the country of origin. Thus, simplified object recognition techniques may be employed that need only recognize numeric integers and the patterns thereof. For a US based phone number the registered phone number may be identified based on a series of numbers having a pattern of three integers followed by three more integers and a set of four integers as a US registered phone number (e.g., ###, ###, and ####). In some embodiments, parentheticals, dashes, periods, etc. may be omitted and/or ignored in obtaining the integer patter.

Step 220 may be performed to obtain either an international and/or domestic registered phone number. Registered phone numbers generally comprise a predetermined pattern dependent on the country of origin, for example, including a country code followed by a phone number. For example, returning to FIG. 1, registered phone number 154 is illustratively provide as a US phone number and thus corresponds to a country code of 001 (not shown) followed by the phone number 154 comprising three integers ("4, 0, and 8") followed by three more integers ("2, 3, and 9") and finished with four integers ("Y, Y, Y, and Y"). In the embodiment of FIG. 1, step 220 may obtain the content of "409", "239, and "YYYY" to recognize that this patter is a phone number. As another example, the registered phone number may include a "+" signifying the international calling prefix, followed by the country code, and then the phone number. This may apply to both an international and/or domestic phone number depending on the country code. Step 220 may then obtain at least the phone number following the country code, and preferably the country code and phone number. In some embodiments, step 220 may be able to identify a "+" as indicative of a registered phone number and then obtain the registered phone number that follows. In some embodiments, step 220 may be able to identify a country code as indicative of a registered phone number and obtain that number.

Once the content is obtained, the process proceeds to decision step 230, where it is determined whether a unique identifier is present on the business card. For example, step 230 may include accessing the saved obtained content and locate any content classified as a unique identifier. If a unique identifier was not recognized at step 220, the process returns to step 210. In some embodiments, the process may be repeated to confirm that content representing a unique identifier was not missed, otherwise the process 200 is repeated on another business card. In some embodiments, if a unique identifier was not recognized, the user may be prompted to send a communication to the contact (e.g., an SMS text, MSM text, email, chat message, etc.), via the obtained registered phone number, to invite the contact to register with the app and/or contact management server using the obtained registered phone number. If a unique identifier was recognized and classified in step 220, then the process 200 proceeds to step 240. As described above, the unique identifier may be indicative that the contact has registered with a contact management server (e.g., server 110 and/or database 114 of FIG. 1), which may store the contact information of the contact in association with a contact identifier.

At step 240, the process 200 determines which piece of textual information is associated with the unique identifier. As described above, the determination in step 240 may be indicative that the contact registered with the contact management server using the registered phone number associated with the unique identifier. In response to registration, the contact management server may have generated the contact identifier based on the contact information. Thus, the contact identifier may include or otherwise be the registered phone number associated with the unique identifier.

In some embodiments, proximity of the unique identifier in relation to the other pieces of textual contact information may be indicative that the unique identifier is associated with a given registered phone number, particularly for example where there are multiple phone number present (e.g., a mobile an land-line phone number). For example, the registered phone number that is near the unique identifier may be associated therewith. As another example, the unique identifier may be closer to the registered phone number than the other pieces of textual contact information, indicating the association. An example implementation of step 240 may be performed using sub-process 400 illustrated below in FIG. 4.

In another embodiment, step 240 may include receiving a user input (e.g., physical interaction with an interface, voice input, etc.) indicating a registered phone number is associated with the unique identifier. For example, a user may include an indication when entering the contact information (e.g., checking a box, entering data into a unique identifier field, voice input, etc.). In another embodiment, the user may be presented an image of the business card on a display of a device, and interact with the image to enter data. For example, the user may be able to select the phone number via pressing on the display at an approximate location of the phone number. The device may then either recognize or be instructed by the user that the selected textual contact information is a phone number. The user may then select the unique identifier in a similar manner, and indicate the association via the interface (e.g., due to order of selection, through a finger interaction connecting the two pieces of content, etc.). An example implementation is provided by the GUIs 600A and 600B of FIGS. 6A and 6B discussed in greater detail below.

Once the association is determined between the registered phone number and the unique identifier, a record locator may be generated for retrieving contact information at step 250. For example, the record locator may be generated based on the registered phone number that is associated with the unique identifier. The record locator may be included in a request for contact information corresponding to the contact of the business card. The record locator may comprise the registered phone number. In some embodiments, the record locator is the registered phone number. The record locator may be transmitted via the network to the contact management server. The contact management server may receive the record locator and locate a contact identifier stored in a database (e.g., database 114 and/or local database 134) that comprises the registered phone number included in the record locator. Thus, retrieving the contact information may comprise sending the registered phone number associated with the unique identifier and locating contact information saved in a database associated with a piece of contact information corresponding to the registered phone number. The contact information can then be received by the device of the user and stored in association with the registered phone number associated with the unique identifier at step 250.

In some embodiments, the record locator generated in step 250 includes identifying a country code corresponding to the registered phone number. In some scenarios, the business card may include the country code. Thus, the country code may be obtained in, for example, step 220 and included in the record locator. In other scenarios however, the business card, and thus the obtained registered phone number, may lack a country code (or even a zip code). Here, step 250 may include determining the country code. In one embodiment, the user may enter the country code. In another embodiment, the country code may be determined based on context derived from the business card. Context may include, but not limited to, textual information of the business card (e.g., an address of the contact and/or company), a database search (e.g., over the internet) based on the contact's name or company, etc. This information may be used to derive a most likely geolocation of the phone number, and then retrieve the country code (or zip code) based on the geolocation for the phone number on the business card. In some embodiments, the context may be identified, for example, by character and object recognition techniques as described in connection to FIG. 3.

In some embodiments, as will be described in connection to FIG. 3, the business card may be received as an image via an image capture device comprising pixel data of the business card and metadata associated with the captured image. Included in the metadata may be, among other metadata, geolocation information (e.g., a geo-tag) related to the image, such as for example, a global position system ("GPS") coordinates of where the image was captured. The geo-tag may be indicative of the location of origin of the business card. For example, a user may visit a country and receive business cards from contacts in that country. Images taken of these business cards may include a geo-tag identifying the country in which the image was capture. Thus, if the country code is missing from the registered phone number, then, at step 205, the country code may be determined using the geo-tag and the country code retrieved therefrom.

In some embodiments, step 205 may also include validating and/or confirming that the country code and/or zip code obtained and/or retrieved for the phone number is correct. For example, the context of the business card and/or geo-tag may be accessed and compared against the country code and/or zip code obtained from the business card to confirm that it is accurate. In response to a mismatch, the process may then prompt the user to confirm that the obtained country code and/or zip code is accurate. Additionally, the geo-tag may be used to confirm a county code and/or zip code identified based on the contextual information on the business card, or vice versa.

While the foregoing is described in reference to one or more steps of process 200 executed by the user device, such is not intended to be limiting. One skilled in the art will recognized that any one or more of the steps in process 200 (or related sub-processes) may be performed by the user system 130 (e.g., as a thick client), by the server 110 (e.g., as a thin client), or any combination thereof. For example, the server 110 may be configured to identify a country code and include such in the record locator and/or contact locator.

In an example operation of process 200, business card 150 may be provided to a user. The business card 150 includes mobile phone number 154 and unique identifier 155 depicted as "BIN" in a cursive font for illustrative purposes only (any unique identifier is possible). At step 210, the business card 150 may be provided to the user and/or received by a mobile device of the user (e.g., user system 130). For example, a camera may capture an image of the business card 150 and/or the user may input the all textual contact information 152 of the business card. At step 220, the device may obtain the textual information by extracting text and recognizing at least the phone number 154 and unique identifier 155. Each piece of information may be classified according to the type of information recognized in the text and/or content. Based on obtaining the unique identifier 155, the device can determine the unique identifier 155 is present at step 230 and then determine an association with the registered phone number. At step 240, the unique identifier 155 is determined to be associated with the phone number 154, at least based on either a user input and/or proximity of the unique identifier 155 in relation to the phone number 154. At step 250, the device may generate a record locator using the phone number 154 and send the record locator to server 110. The server 110 may use the record locator to access the database 114, locate a contact identifier associated with a contact based on the phone number 154 in the record locator, and send contact information corresponding to the identifier contact to the device. At step 260, the device may store the contact information in association with the phone number 154 in the database 134.

While the above example is provided with reference to specific examples of registered phone numbers and a unique identifier, it will be appreciated that any registered phone number extracted from the business card may be used for performing the process 200 (e.g., land-line phone numbers, mobile phone numbers, domestic phone numbers, international phone numbers, etc.). In some implementations, using a phone number may be advantageous as the number (particularly a mobile number) is likely to be consistent between different businesses (and thus different business cards) that a particular contact may provide. As another example, the phone number (particularly a mobile number) is likely to be consistent between different endeavors and/or facets of a contacts business, as explained in more detail in connection to FIG. 8B. Furthermore, as the contact information is in the database 114 is updated due to changes in business, company, employment, etc. it is likely that the mobile phone number will remain unchanged. Thus, the user may be able to easily locate and organize contacts.

Figure 3:
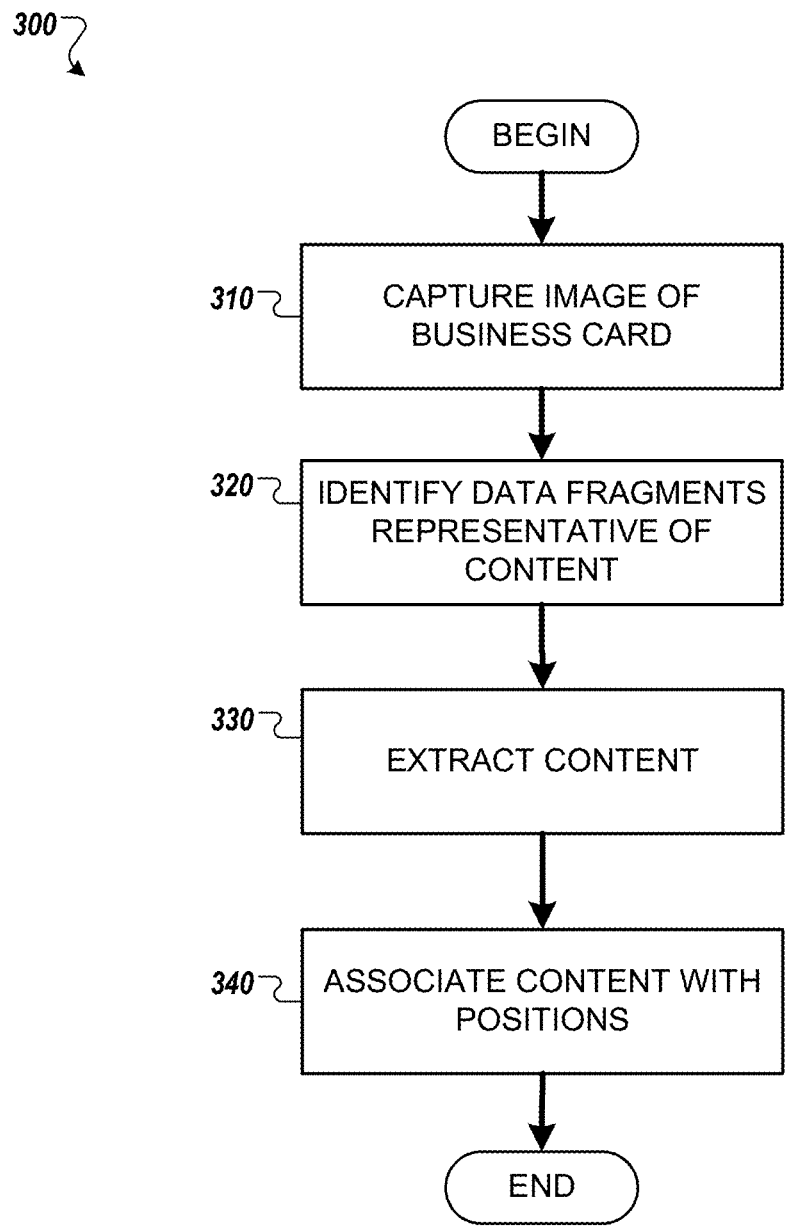
FIG. 3 illustrates a flow chart of a sub-process for obtaining contact information in accordance with an example implementation of the present application.

FIG. 3 illustrates a flow chart of a sub-process 300 for obtaining content form a business card. The sub-process 300 may be performed as part of, for example, process 200 of FIG. 2 discussed herein. The sub-process 300 may be performed by a one or more devices in a networked environment such as the example system 100 illustrated in FIG. 1 discussed above. In some embodiments, the sub-process 300 may be performed by one or more computing device such as example computing device 905 of the example computing environment 900 illustrated in FIG. 9 discussed below. In some embodiments, the computing device 905 may an example of one or more of the server 110, user system 130, and/or external system 140. In some embodiments, the sub-process 300 may be performed by a client (e.g., thin or thick client as described in connection to FIG. 1).

In some implementations, a business card may be received via an image capture device (e.g., a camera, video capture device, etc.) comprised in a user system (e.g., user system 130 of FIG. 1) or communicatively coupled thereto. At step 310, the image capture device may be used to capture an image of the business card. This image may be stored as pixel data that may be rendered on a display as a plurality of pixels to depict an image of the business card. An example representation of a captured image is provided by user interface 600A illustrated in FIG. 6A discussed in greater detail below.

At step 320, data fragments representative of content of the business card are identified and the content therein extracted, step 330. In some embodiments, one or more data fragments may be representative of textual contact information of the business card. Additionally, one or more data fragments may be representative of other content, such as images, symbols, pictures, thumbnails, etc. that are depicted by the business card. Once data fragments including such content are identified the content therein may be extracted and classified as described above.

Steps 320 and 330 may be performed through various image processing and object recognition techniques, for example, as an order process (e.g., recognize and then extract), in parallel, or as part of a single processing technique. For example, text recognition techniques may be used to extract words from the image. Similarly, object recognition techniques may also be used to extract integers and words as well as objects and other features from the image. For example, a registered phone number and a text based unique identifier may be recognized using text recognition techniques. In some implementations, the unique identifier may be an image, symbol, or non-text based feature that can be recognized using object recognition techniques. Further, in some embodiments, both text and object recognition techniques may be used in parallel or sequentially to recognize both a textual aspect of the unique identifier as well as features and characteristics of the unique identifier (e.g., font, size, color, etc.).

Example text recognition techniques include, but are not limited to, Optical Character Recognition, Optical Word Recognition, Intelligent Character Recognition, Intelligent Word Recognition, Handwriting Recognition, etc. Example object recognition techniques include, but art not limited to, Edge Detection, Feature Detection, Corner Detection, Blob Detection, Ridge Detection, Feature Description, Scale Space, Structure Tensor Algorithms, etc. In some implementations artificial neural networks may be trained to recognize and classify textual information from the image. Other artificial intelligence or machine learning techniques may be employed to identify content contained in an image and recognize and classify the content for subsequent use.

In some embodiments, using a registered phone number as described herein provide various advantages over conventional systems. For example, business cards may be provided in any language and include textual content information or other information in any language. Furthermore, conventional systems may require a QR code or an additional alphanumeric serial number generated by the system and meets standards set by the conventional systems. Thus, character recognition or object recognition algorithms would be required to parse through, identify, and interpret different languages and characters to extract the sought after information to then retrieve contact information. Whereas, contacts are generally associated with at least a single phone numbers before registering with the contact management server. These phone numbers comprise numeric integers having a predictable and predetermined pattern to meet standards and conventions based on the country of origin, as described above. Thus, simplified object recognition techniques may be employed that need only recognize numeric integers and the patterns thereof. For example, the app described herein may be configured to identify a series of numbers and recognize a pattern corresponding to predetermined patters that meet phone number standards and conventions. Thus, the algorithm may be simplified by permitting it to ignore, discard, or otherwise pass over words and character strings that do not meet the standards set forth in the algorithm.

Furthermore, image processing techniques may be configured to determine a position of each data fragment within the image of the business card and associate the position with the content extracted from the data fragment (step 340). For example, a given point on the business card (e.g., a corner or other position) may be set as an origin and each piece of textual contact information and/or content may be determined therefrom. In some embodiments, the position may be determined based on a pixel count from the origin. Other positioning techniques are possible. In some embodiments, the origin may be set to a given piece of the textual contact information and/or the unique identifier, and relative distances may be determined therefrom. Association may be achieved, for example, by including metadata with each piece of extracted textual contact information that includes positional information.

Figure 4:
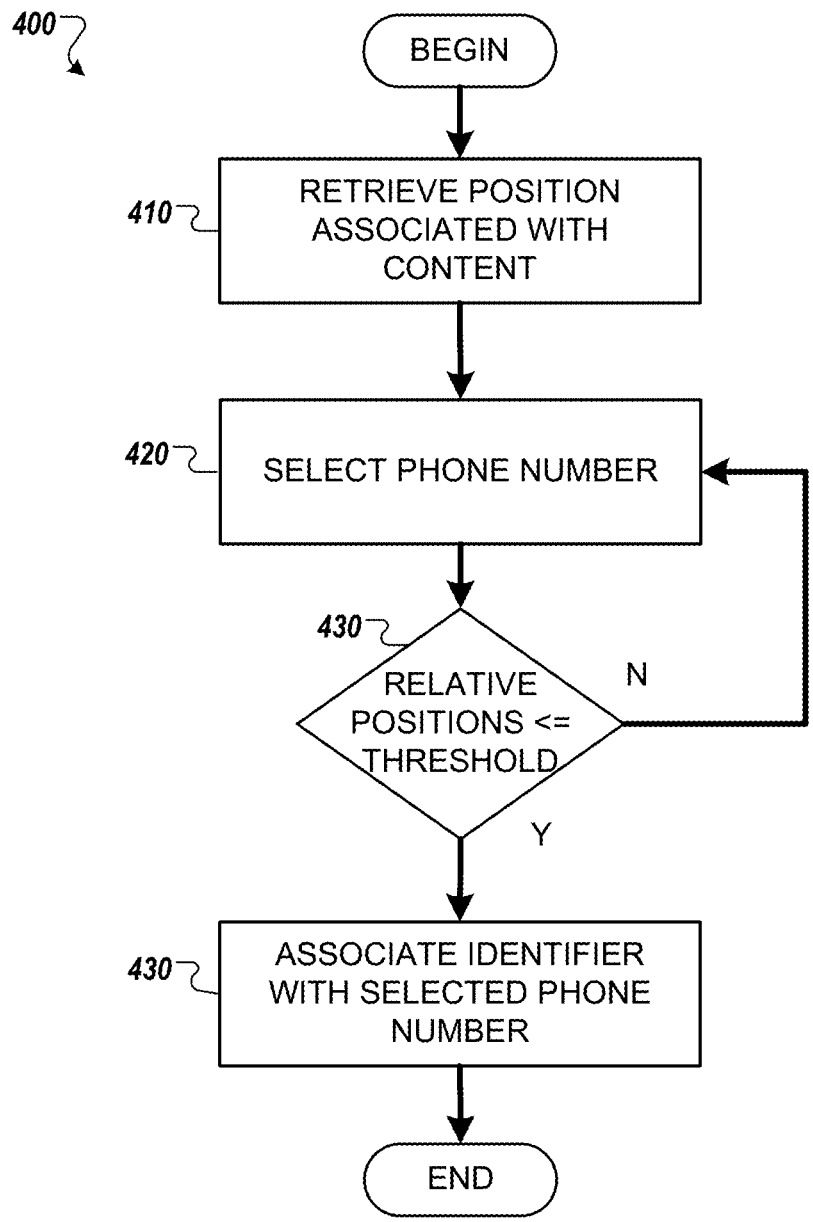
FIG. 4 illustrates a flow chart of a sub-process for determining an association between pieces of information in accordance with an example implementation of the present application.

FIG. 4 illustrates a flow chart of a sub-process 400 for determining an association between the unique identifier and a registered phone number. The sub-process 400 may be performed as part of, for example, process 200 of FIG. 2 discussed herein. In some embodiments, sub-process 400 may be performed as part of process 200 following sub-process 300 of FIG. 3. The sub-process 400 may be performed by a one or more devices in a networked environment such as the example system 100 illustrated in FIG. 1 discussed above. In some embodiments, the sub-process 400 may be performed by one or more computing device such as example computing device 905 of the example computing environment 900 illustrated in FIG. 9 discussed below. In some embodiments, the computing device 905 may an example of one or more of the server 110, user system 130, and/or external system 140. In some embodiments, the sub-process 300 may be performed by a client (e.g., thin or thick client as described in connection to FIG. 1).

At step 410, relative position information associated with each piece of content of the business card is retrieved. For example, each piece of textual contact information and the unique identifier may be stored in association with a position (e.g., as part of metadata saved for each piece of content). An example implementation for determining positions of each piece of content is described above in connection to FIG. 3.

At step 420, a registered phone number of the content is selected (e.g., as previously obtained as described above). For example, the business card may include content that includes a plurality of textual contact information (e.g., phone number, email, etc.) and, at step 420, a registered phone number is selected for further analysis. At step 430, the position of the unique identifier is compared with the position of the selected registered phone number, and, if the relative position is less than or equal to a threshold, the selected registered phone number is associated with the unique identifier (e.g., step 430). If the relative positions are not within the threshold, the sub-process 400 returns to step 420 and selects another piece of content for comparison, for example, another phone number if present.

In some implementations, the threshold may be simply a minimum distance or number of pixels (where an image of the business card is available) between the unique identifier and the selected registered phone number. Thus, at step 430, the unique identifier may be determined to be associated with a selected registered phone number when the position of the unique identifier is less than or approximately equal to a threshold distance from the position of the selected registered phone number.

In another embodiment, the threshold may be dynamic. For example, a relative distance between the unique identifier and each registered phone number and the threshold may be the pair (e.g., unique identifier and registered phone number) having the smallest relative distance. Thus, at step 430, the unique identifier may be determined to be associated with a selected registered phone number when the distance between the unique identifier and the selected registered phone number is less than the distance between the unique identifier and other information on the business card.

Figure 5:
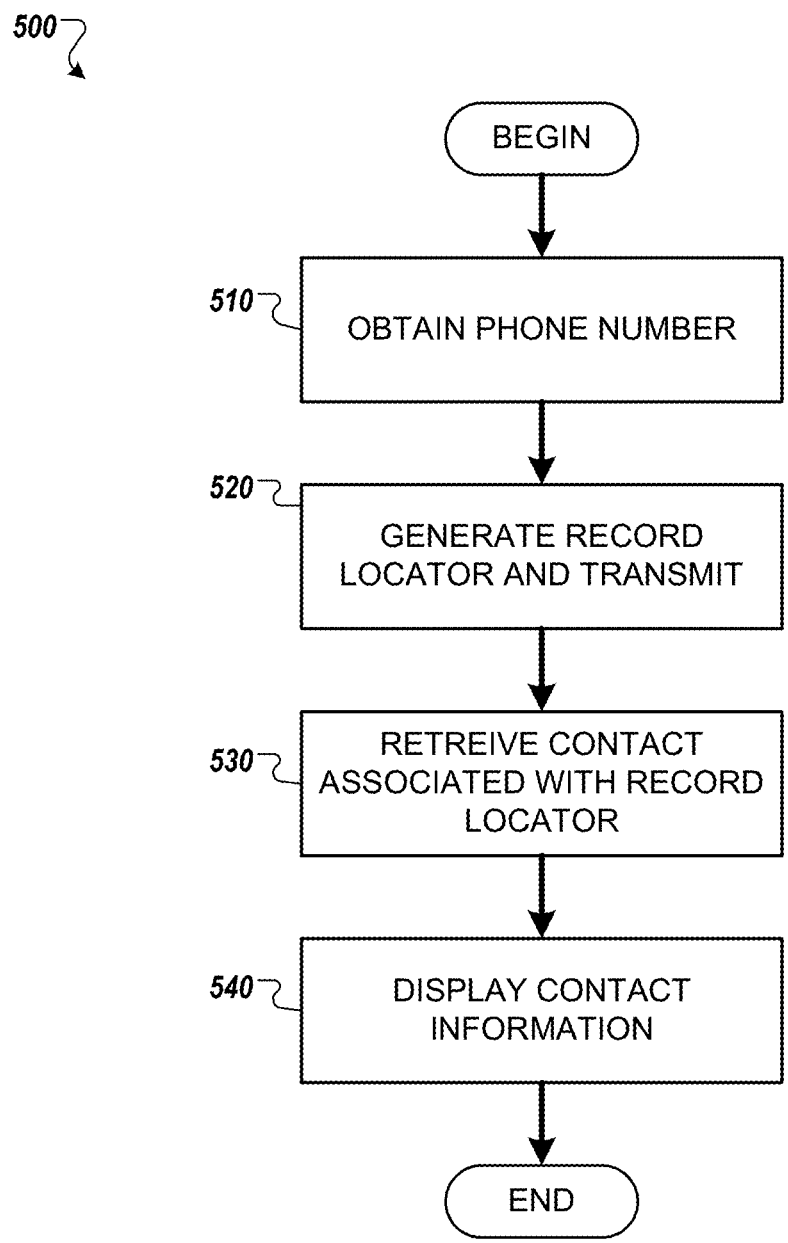
FIG. 5 illustrates another flow chart for accessing contact information in accordance with an example implementation of the present application.

FIG. 5 illustrates a flow chart of a process 500 for retrieving contact information of a contact in accordance with an example implementation of the present application. The process 500 may be performed by a one or more devices in a networked environment such as the example system 100 illustrated in FIG. 1 discussed above. In some embodiments, the process 500 may be performed by one or more computing devices such as example computing device 905 of the example computing environment 900 illustrated in FIG. 9 discussed below. In some embodiments, the computing device 905 may an example of one or more of the server 110, user system 130, and/or external system 140. In some embodiments, the process 200 may be performed by a client (e.g., thin or thick client as described in connection to FIG. 1).

Though the elements of process 500 may be illustrated in a particular sequence, example implementations are not limited to the particular sequence illustrated. Example implementations may include actions being ordered into a different sequence as may be apparent to a person of ordinary skill in the art or actions may be performed in parallel or dynamically, without departing from the scope of the present application.

At step 510, contact information of contact is obtained, for example, by a user of a device (e.g., a user system 130). The contact in this example may be a person who the user is searching for additional contact information, but the user may only have access to a single piece of contact information, for example, a phone number. Thus, the user may input the contact information into a mobile device and/or capture the contact information using a camera.

The device may generate a record locator at step 520 that at least comprises the registered phone number. The record locator may be similar to the record locator described above in connection to FIG. 2. Thus, the record locator may comprise or otherwise be the registered phone number.

The record locator may be sent to a contact management server to retrieve additional contact information of the contact based on the record locator (e.g., step 530). Retrieving the contact information may be performed in a manner that is substantially similar to the retrieval in step 250 of FIG. 2. For example, the contact may have previously registered with the contact management server, thereby generating a contact identifier. The record locator is used by the server to locate the contact identifier and corresponding contact. The contact information associated with the contact may then be transmitted to the device of the user and displayed and/or stored at step 540. In the event that a contact identifier is not found in the contact management server, the server may transmit a notification to the device of the user indicating that a contact identifier cannot be located based on the record locator. This may occur due to either an incorrect phone number and/or the contact has not registered the phone number with the contact management server. The device of the user (or the user) may confirm that the registered phone number is correct (e.g., visual inspection and/or contextual analysis as described above in connection to FIG. 2) and try again with a corrected phone number. If the phone number is correct (e.g., indicative that the contact has not registered), the device of the user may prompt the user to send a communication (e.g., a text, email, etc.) to the contact inviting him/her to register the phone number with the contact management server.

As an example, the user may only have a mobile phone number of a contact. The user may input or otherwise provide the phone number to his/her device in step 510. The device may generate a record locator using the phone number at step 520 and retrieve the contact associated with the phone number at step 530. The contact information of the contact may then be displayed and/or stored in the user device at step 540.

Accordingly, a non-limiting advantage of embodiments described herein is an ability to locate a contact and retrieve addition contact information (including one or more business cards) by using only a single piece of information. For example, a phone number. Other contact information may be employed instead of a phone number.

Figure 6A:
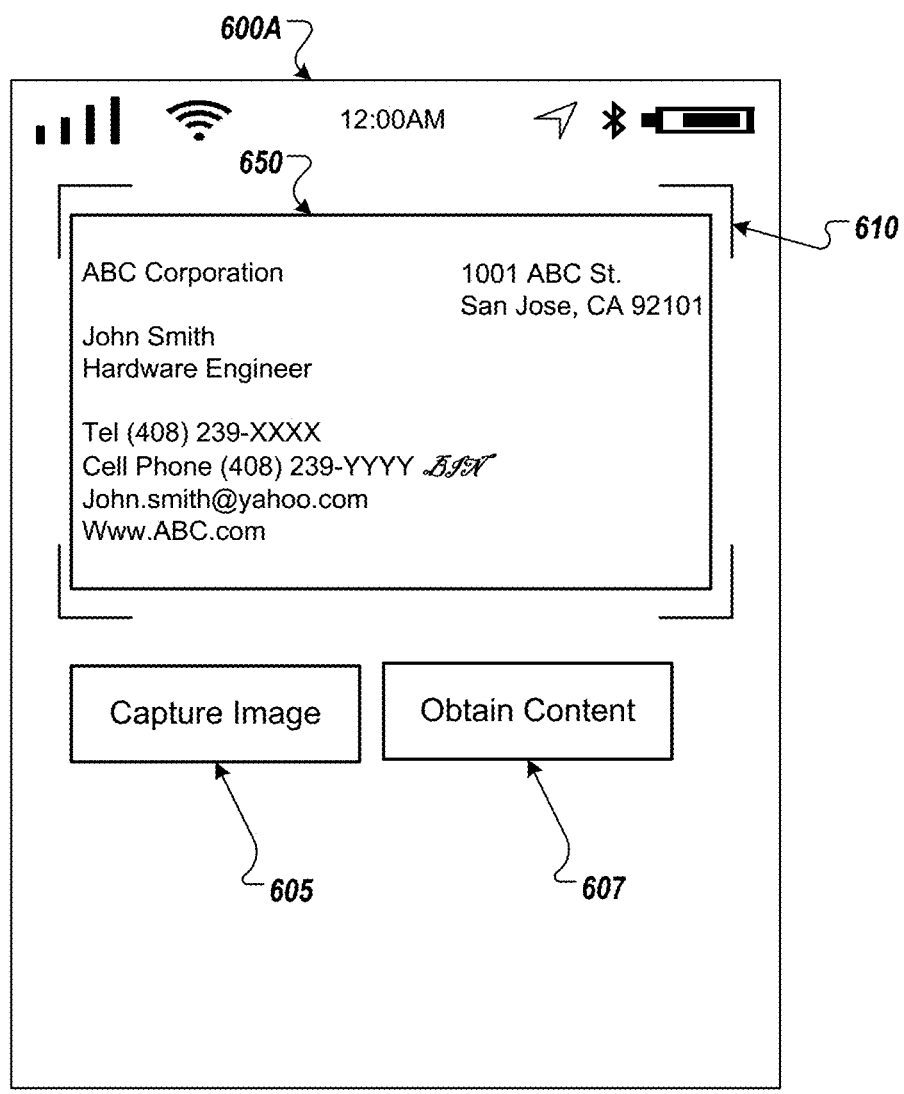
FIGS. 6A-6B illustrate graphical user interfaces (GUIs) that may be used to control the system in accordance with an example implementation of the present application.
Figure 6B:
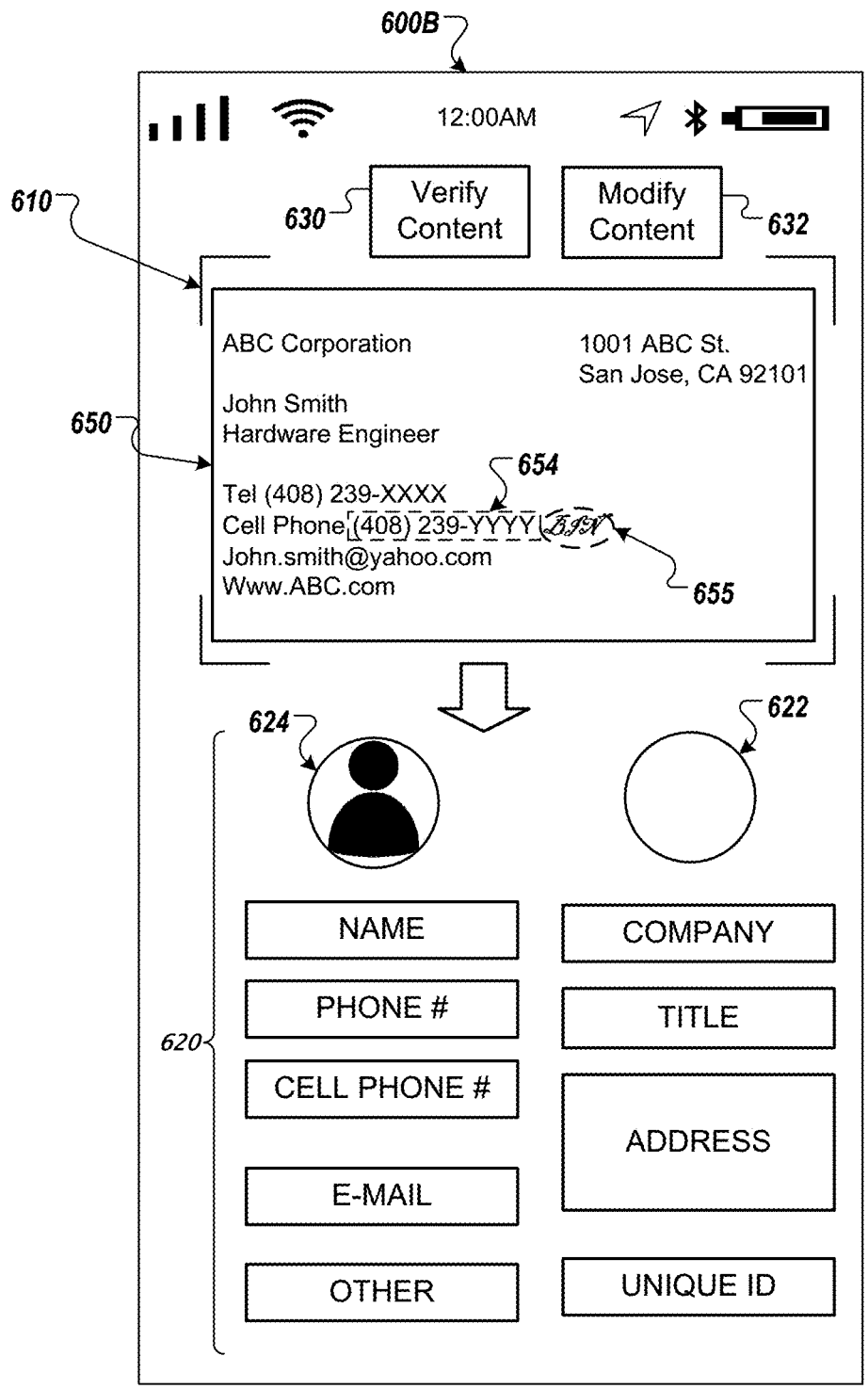

FIGS. 6A-6B illustrate example graphical user interfaces (GUIs) 600A-B (collectively referred to as "GUIs 600") that may be used to control the system in accordance with an example implementation of the present application. The GUIs 600 may be displayed on a display device including, but not limited to, a computer monitor, TV, touchscreen display of a mobile device, a laptop display screen, or any other display device that may be apparent to a person of ordinary skill in the art. For example, GUIs 600 may be executed by a one or more devices in a networked environment such as the example system 100 illustrated in FIG. 1 discussed above. In some embodiments, GUIs 600 may be executed by one or more computing device such as example computing device 905 of the example computing environment 900 illustrated in FIG. 9 discussed below. In some embodiments, GUIs 600 may be executed by a client (e.g., thin or thick client as described in connection to FIG. 1) installed on a computing device 905 and/or user system 130.

As illustrated in FIG. 6A, the GUI 600A may include a window 610 and a plurality of buttons or icons 605-607. The window 610 may provide a preview of a captured or obtained business card. For example, the device including GUI 600A may be coupled to camera for capturing an image of business card 150. The window 610 may provide a preview 650 of the business card 150 prior to capturing an image and/or may display the captured image.

The GUI 600A may also include one or more buttons or icons 605 and 607 that may be used by the user to control the operations of the device. Icon 605 may be provided to control the capturing of the image, for example, by causing the camera to take a picture of the business card 150. Icon 607 may be provided to control the functions system, for example, process 200 of FIG. 2. For example, icon 607 may be controlled by the user to obtain the content via the various image processing techniques described above.

Once icon 607 has been pressed, the device may execute one or more processes described above to identify, recognize, and extract the content and classify the content as at least a registered phone number and/or a unique identifier. GUI 600B of FIG. 6B depicts one such example. Window 610 may remain depicting the captured image preview 650 of business card 150. The captured image may be processed to identify registered phone number shown as box with dotted lines and a unique identifier 655 in accordance with the processes described herein. The identified registered phone number may be used to retrieve contact information which may populate contact fields 620 according to the type of contact information. For example, "John Smith" may populate the "NAME" field, "ABC Corporation" may populate the "COMPANY" field, etc. In some embodiments, an image 624 of the contact and/or a company logo 622 may be retrieved and displayed in the contact fields 620. Multiple fields may be available and dynamically displayed as needed based on the classifications and contact information retrieved from the contact management server. For example, in the event that a website is provided a "WEBSITE" field (not shown) may be displayed and filled accordingly.

In some embodiments, contact information retrieved from the contact management server for populating the contact fields 620 may include the textual contact information from the business card 150, less contact information, or more contact information. The retrieved contact information may be based on the information provided by the contact when he/she registered the phone number with the contact management server. Accordingly, in some embodiments, the retrieved contact information may include more information than generally included on a business card, such as for example, images 624 and 622 or any other information the contact may have included while registering. For example, the contact may have included products, properties, offers for sale, investment opportunities, etc. that may also populate other fields 620.

The GUI 600B may also include one or more buttons or icons, for example, icons 630 and 632 that may be used by the user to control the operations of the device. Icon 630 may be provided to control verification and/or confirmation and icon 635 may be provided to initiate correction of obtained content. For example, the user may operate icon 630 to verify that the extracted registered phone number and/or unique identifier is correctly identified and/or obtained. Alternatively, the user may interact with icon 632 to permit the user to modify the content. In some implementations, the user may modify the content by interacting with a given field 620. In another implementation, the icon 632 may initiate a subsequent image processing to re-identify and extract the content. Furthermore, in some embodiments, the user may interact with the image 650 to select features of the image. Selecting a certain feature may cause the device to evaluate that feature to extract content therefrom. In some implementations, the user may interact with the image 650 to identify the unique identifier 655 and/or the associated textual contact information 654 on the image. Alternatively, the image may be processed as described in connection to FIGS. 3 and 4 to determine the association. Once the content is verified via icon 630, the device may be configured to generate the record locator based on the association of the unique identifier 655 and registered phone number 654 in accordance with the processes described herein. In some embodiments, the user need not verify the content view icon 630, as the device may be configured to automatically generate the record locator and retrieve the contact information based on identifying the unique identifier 655 and associated textual contact information 654.

FIGS. 7A-7E illustrate example graphical user interfaces (GUIs) 700A-C (collectively referred to as "GUIs 700") that may be used to control the system in accordance with an example implementation of the present application. For example, GUIs 700 may be used to control the system to retrieve and display contact information, for example, as described in connection to FIG. 5 above. The GUIs 700 may be displayed on a display device including, but not limited to, a computer monitor, TV, touchscreen display of a mobile device, a laptop display screen, or any other display device that may be apparent to a person of ordinary skill in the art. For example, GUIs 700 may be executed by a one or more devices in a networked environment such as the example system 100 illustrated in FIG. 1 discussed above. In some embodiments, GUIs 700 may be executed by one or more computing device such as example computing device 905 of the example computing environment 900 illustrated in FIG. 9 discussed below. In some embodiments, GUIs 700 may be executed by a client (e.g., thin or thick client as described in connection to FIG. 1) installed on a computing device 905 and/or user system 130.

As illustrated in FIG. 7A, the GUI 700A may include a dialing interface 764, a calling icon 766, a contact retrieval icon 770, and a phone number display region 754. The GUI 700A may also include a back space icon 768, an add number icon 767, and a plurality of device functionality buttons or icons 762.

The dialing interface 764 may comprise a numeric keypad through which the user may enter a phone number. The back space icon 768 may be used to make corrections to the entered phone number. Thus, the device may obtain the phone number (e.g., as described in step 510 of FIG. 5) via user interaction with the dialing interface. The obtained phone number may be displayed in the phone number display region. Then the user may interact with one or more of icons 766 or 770 to operate the device based on the obtained phone number. For example, the calling icon 766 may be used to make a telephone call using the phone number. In some embodiments, the contact retrieval icon 770 may provide access to the contact management server based on, for example, the obtained phone number. Contact retrieval icon 770 may operate the device to generate a record locator and transmit the record locator to the contact management server, for example, as described in connection to FIG. 5.

The GUI 700A may also include one or more buttons or icons 762 that may be used by the user to control the operations of the device. For example, icons 762 may include a favorite, a recents, a contacts, a keypad, and a voicemail icon each of which may be provided to control the operations of the device. For example, the favorites icon may provide access to the user's favorite and/or most common contacts. The recents icon may provide access to the contacts that the user may have most recently accessed. The contacts icon may provide access to all contacts and contact information stored in the user device. The keypad icon may provide access to dialing interface 764. The voicemail icon may provide access to the voicemail box of the user device.

In some embodiments, the add number icon 767 may provide access to additional optional functionality of the device. For example, the user may interact with the add number icon 767 to transition to GUI 700B of FIG. 7B. GUI 700B illustrates a plurality of options 780 overlaid on the GUI 700A. Options 780 includes a plurality of options, such as but not limited to, a cancel icon 782, add to current contacts icon 784, create new contact icon 786 and an access contact server icon 788. Access contact server icon 788 may provide access to the contact management server based on, for example, the obtained phone number displayed in region 754 for generating a record locator as described above.

Create new contact icon 786 may generate a new contact for storage in a memory of the device. Creating a new contact may include storing the obtained phone number in the memory of the device. In some embodiments, creating a new contact may include retrieving contact information, for example, as described in FIG. 5 based on the obtained phone number.

The add to current contacts icon 784 may modify an existing contact stored in a memory of the device. For example, the add to current contacts icon 784 may add the obtained phone number to an existing contact. In other embodiments, the add to current contacts icon 784 may include retrieving contact information, for example, as described in FIG. 5 based on the obtained phone number and adding this information to a current contact.

As illustrated in FIG. 7C, the GUI 700C be an interface for searching contacts of a user. As illustrated, GUI 700C may include a search window 710, a plurality of contacts 720 and an optional scroll bar 705. The plurality of contacts 720 may comprise one or more contacts of the user. In some embodiments, the contacts 720 may be saved in association with a plurality of contact information locally on the device. In other embodiments, the contacts may be saved with one or more pieces of contact information, while other pieces of information may be saved remotely at the contact management server. In some embodiments, GUI 700A may be accessed via the contacts icon of icons 762 and/or through the add to current contacts icon 784.

A user may interact with search window 710 to input contact information that the user currently has access too. The contact information may be, for example, a name, phone number, etc. When the user interacts with the search window 710, an alphanumeric input interface (for example, GUI 700A) may be generated overlaid the contacts 720. The user may enter the contact information using the interface to locate a contact associated with entered contact information and any other information stored on the device. Alternatively, or in combination, the user may interact with a scroll bar 705 to search through the plurality of contacts to retrieve the same information.

In some implementations, a user may enter a piece of contact information which is associated with a contact that the user may not have stored in his/her device or may only have a subset of the contact's complete contact information. Thus, the device may generate a record locator and retrieve contact information, for example, in accordance with process 500 of FIG. 5. In some implementations, where the access to GUI 700C was via add to current contacts icon 784, a user may select a contact and modify information locally stored on the device based on the obtained phone number.

Figure 7E:
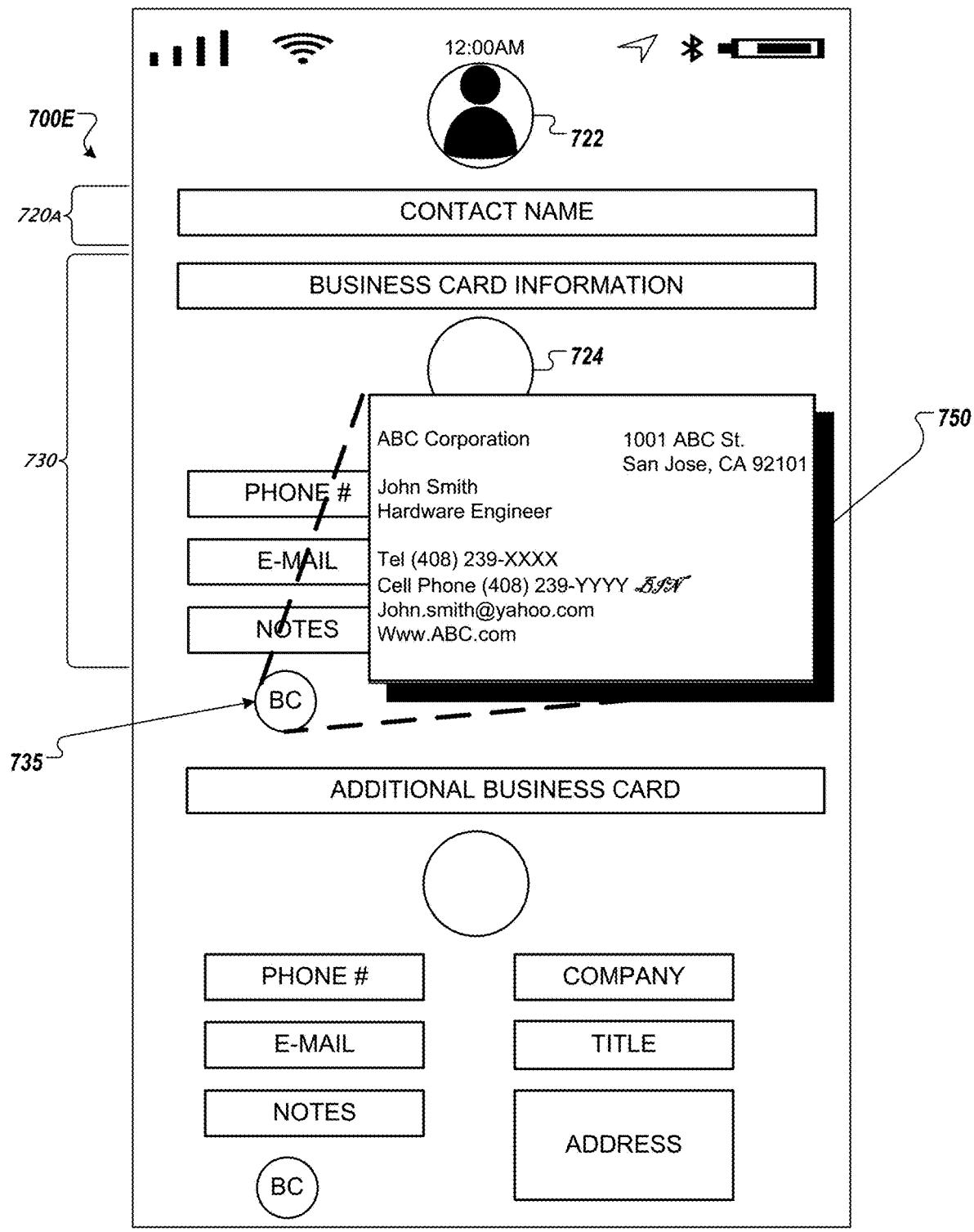

Once a contact is identified and/or contact information is retrieved, the GUI may transition to GUI 700D. As illustrated in FIG. 7D, the GUI 700D may comprise a plurality of contact information for a given contact 720A. For example, a first set of contact information 730 may be retrieved and displayed according to embodiments described herein. For example, the contact information 730 may include a part of, all, or more information than presented on a business card from the contact (e.g., an image 722, logo 724, additional information as described herein, etc.). Furthermore, a BC icon 735 may be provided for generating an image representation of a business card corresponding to the first business card information 730. For example, FIG. 7E illustrates an image 750 of such a business card displayed overlaid the GUI 700D. It will be appreciated that any one of the contact information 730 and/or image 750 of corresponding business card may be retrieved in accordance with embodiments described herein.

In some implementations, the contact may be associated with multiple business cards and/or endeavors associated with a unique identifier extension (e.g., as described below in connection to FIG. 8B. Thus, the GUI 700D may also display one or more additional contact information, for example, second contact information 740. Second contact information 740 may also include a BC icon 745 that operates similar to BC icon 735, but retrieves an image of business card corresponding to information 740.

Figure 8A:
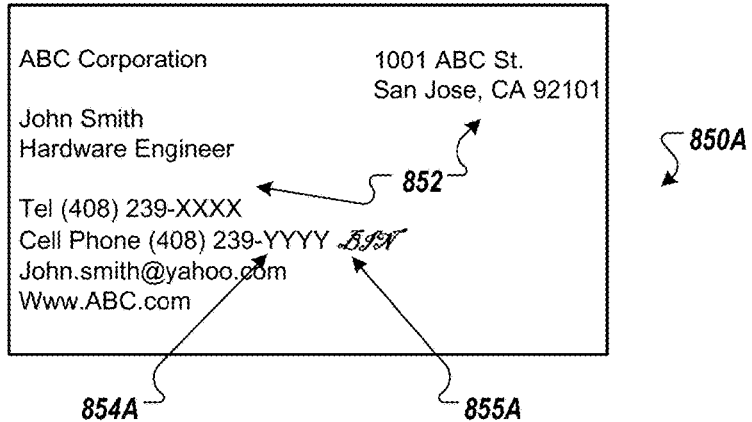
FIGS. 8A-8C illustrate various examples of business cards that may be used for performing one or more of the processes described herein in accordance with an example implementation of the present application.
Figure 8B:
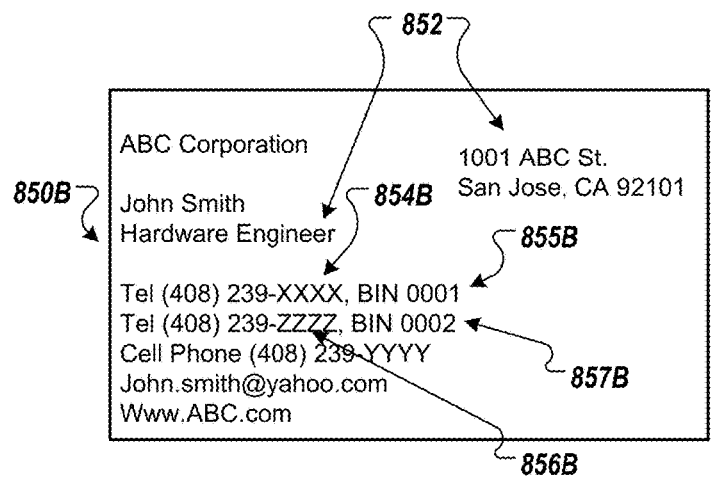
Figure 8C:
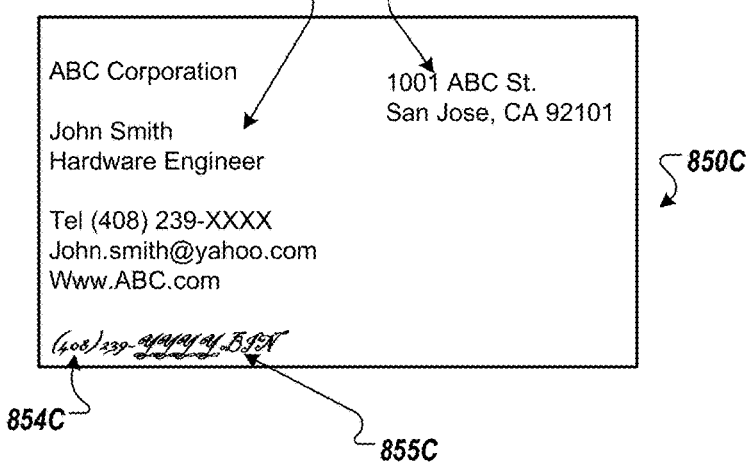

FIGS. 8A-8C illustrate example business cards 850A-850C in accordance with example implementations of the present application. As described herein, embodiments of the present application are not limited to business cards only, but any physical and/or electrical object and/or item that may comprise contact information thereon. In some embodiments, business cards 850A-850C may be used in conjunction with one or more devices in a networked environment such as the example system 100 illustrated in FIG. 1 discussed above. For example, business cards 850A-850C may be utilized as business card 150. In some embodiments, business cards 850A-850C may be used in conjunction with one or more computing device such as example computer device 805 of the example computing environment 800 illustrated in FIG. 8 discussed below.

Each business card 850A-850C comprises content displayed thereon. The content may be printed on a physical card, flyer, etc. or may be displayed in an electronic format such as a signature block of an email or electronic document. As described herein, content may include textual contact information representative of contact information corresponding to the contact identified in on the business card. For example, each business card 850A-850C comprises a company name (e.g., "ABC Corporation"), a contact name ("e.g., John Smith"), an occupation title or position (e.g., "Hardware Engineer"), a land line phone number (e.g., "(408) 239-XXXX"), a mobile phone number (e.g., "(408) 239-YYYY"), an email address ("john.smith@yahoo.com"), and a physical geographical address ("1001 ABC St., San Jose, Calif. 92101").

Additionally, each business card 850A-850C comprises at least one unique identifier 855A-855C associated with a registered phone number 854A-854C. The unique identifiers 855A-C and registered phone number 854A-C may be used in accordance with the various processes and embodiments described herein. However, each business card 850A-C is slightly different in the placement or content of the unique identifier and/or the associated registered phone number. For example, FIG. 8A depicts a mobile phone number "(408) 239-YYYY" as the registered phone number 854A associated with a unique identifier 855A ("BIN"). As another example, FIG. 8B depicts a phone number "(408) 239-YYYY" as the registered phone number 854B associated with a unique identifier 855B ("BIN 0001"). Furthermore, FIG. 8C depicts a mobile phone number "(408) 239-YYYY" as the registered phone number 854C associated with a unique identifier 855C ("BIN"), however the mobile phone number may not be included on the business card as illustrated by the italic font. The user may know this phone number or otherwise be provided the number in some other means (e.g., a different communication and/or physical interaction between user and contact).

Referring to FIG. 8B, the business card 580B also illustratively comprises a registered phone number 856B associated with a second unique identifier 857B ("BIN 0002"). Each unique identifier 855B and 857B comprises a common symbol ("BIN") and an extension ("0001" and "0002," respectively). The extensions may be used to associate a given registered phone number with a given endeavor of the contact. For example, the contact associated with business card 850B may be a realtor who has a plurality of properties for purchase. The realtor may register a first phone number 854B with the contact management server and include a first property in the contact information. Thus, a user may retrieve contact information of the realtor, including information about the first property, by obtaining the phone number 854B associated with unique identifier 855B. Similarly, the realtor may register a second phone number 856B with the contact management server and include a second property in the contact information. Thus, a user may retrieve contact information of the realtor, including information about the second property, by obtaining the phone number 856B associated with unique identifier 857B. The phone numbers 856B and 854B may be the same or different phone numbers. Furthermore, the multiple phone numbers 854B and 856B associated with the unique identifiers 855B and 857B, respectively, may be displayed on separate business cards. As another example, a doctor may utilize the unique identifiers 855B and 857B to provide different business cards for different office locations. Thus, a contact may be able to provide business cards for each endeavor (e.g., property in this example), which may provide the user simple and quick access to the endeavor of interest opposed to sifting through all endeavors.

Accordingly, it will be appreciated that any registered phone number may be associated with the unique identifier for locating the contact information within the contact management server. Using known contact information, opposed to embedded data and/or additional serial numbers as in the prior art systems, users can easily recognize the information that can be used to locate contact information of a contact. Furthermore, the user need not retain numerous business cards, because they can leverage a registered phone number that they already have stored in their devices for retrieving other information as well as business cards. Further still, contacts need not locate all associates to update their contact information via a new business card. The contact merely updates his/her information in the contact management server and users will be able to retrieve the updated information using saved textual contact information (e.g., a mobile phone number).

FIG. 9 illustrates an example computing environment 900 with an example computing device 905 suitable for use in some example implementations. Computing device 905 may be suitable for use in the system of FIG. 1, for example, as a user system 130, external system 140, and/or the platform 110. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905. In some embodiments, memory 915 and/or internal storage 920 may be suitable for use as either the local database 134 and/or the database 114 where the computing device is implemented as the user system 130 and/or the platform 110, respectively.

Computing device 905 can be communicatively coupled to input/interface 935 and output device/interface 940. Either one or both of input/interface 935 and output device/interface 940 can be a wired or wireless interface and can be detachable. Input/interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/interface 935 (e.g., user interface) and output device/interface 940 can be embedded with, or physically coupled to, the computing device 905. In other example implementations, other computing devices may function as, or provide the functions of, an input/interface 935 and output device/interface 940 for a computing device 905. These elements may include, but are not limited to, well-known AR hardware inputs so as to permit a user to interact with an AR environment.

Examples of computing device 905 may include, but are not limited to, highly mobile devices (e.g., smartphones, watches, eyewear, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like). Network 950 may be suitable for use as network 120 of FIG. 1.

Computing device 905 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 962, input unit 964, output unit 966, content extraction unit 969, identifier recognition unit 970, information association unit 972, locator generation unit 974, contact management unit 976, and inter-unit communication mechanism 955 for the different units to communicate with each other, with the OS, and with other applications (not shown).

For example, the content extraction unit 968, identifier recognition unit 970, information association unit 972, locator generation unit 974, and contact management unit 976 may implement one or more processes shown in FIGS. 2-5. The described units and elements can be varied in design, function, configuration, or implementation and are not limited to the descriptions provided.

In some example implementations, when information or an execution instruction is received by API unit 962, it may be communicated to one or more other units (e.g., logic unit 960, input unit 964, content extraction unit 968, identifier recognition unit 970, information association unit 972, locator generation unit 974, and contact management unit 976). For example, the input unit 964 may receive content corresponding to a business card. The content extraction unit 968 may obtain and extract the registered phone number and unique identifier included on the business card. In some embodiments, the content extraction unit 968 may also determine positions of content. Further, the identifier recognition unit 970 may identify the presence of a unique identifier, which may be associated with a given registered phone number by the information association unit 972. In some embodiments, the information association unit 972 may also associate content with it corresponding position on the business card. The locator generation unit 974 may receive the associated registered phone number and generate a record locator using the same. The contact management unit 976 may then transmit the record locator via output unit 966 to network 950 for retrieving the contact corresponding to the registered phone number. For example, the output unit 966 may under control of the contact management unit 976 output the record locator to the server 110 via the output device/interface 940 and network 950. The contact management unit 976 may also receive the contact information and manage the storage and associations of the received contact information with contacts. For example, output unit 966 under control of the contact management unit 976 may output the retrieved contact information to the memory 915 for storage and subsequent usage by the user via the output device/interface 940.

In some instances, the logic unit 960 may be configured to control the information flow among the units and direct the services provided by API unit 962, input unit 964, content extraction unit 968, identifier recognition unit 970, information association unit 972, locator generation unit 974, and contact management unit 976 in some example implementations described above. For example, the flow of one or more processes or implementations may be controlled by logic unit 960 alone or in conjunction with API unit 962.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method for managing and retrieving contact information included on a plurality of business cards from a plurality of contacts of a user, the method comprising:

for a given business card, of the plurality of business cards, that corresponds to a given contact of the user:

obtaining, by a device of the user, at least a unique identifier and a registered phone number from the business card;

determining, at a device of the user, the obtained unique identifier is associated with the registered phone number obtained from the business card;

verifying, by the device of the user, the contact corresponding to the business card is registered with a contact management server based on the determination that the obtained unique identifier is associated with the obtained registered phone number, wherein the contact management server comprises a database that stores contact information of the contact in association with a contact identifier comprising the registered phone number;

in response to said determining, generating a record locator comprising the obtained registered phone number by the device of the user, wherein the record locator does not include the obtained unique identifier;

retrieving, from the contact management server, the contact information of the contact based on locating the contact identifier comprising the registered phone number that matches the obtained registered phone number in the record locator; and storing, at the device of the user, the retrieved contact information in association with the obtained registered phone number.

2. The method of claim 1, wherein the unique identifier is a symbol indicative that the contact has been registered with the contact management server.

3. The method of claim 1, wherein the plurality of business cards each comprise the unique identifier as a common symbol indicative that the plurality of contacts have each registered with the contact management server.

4. The method of claim 1, wherein said determining is based in part on a position of the unique identifier on the business card in relation to a position of the registered phone number on the business card.

5. The method of claim 1, further comprising:
capturing an image of the business card using a camera, the image data comprising image data representative of the business card;
processing the image data to identify a plurality of fragments of image data representative of at least the registered phone number and the unique identifier; and
extract the registered phone number and the unique identifier.

6. The method of claim 5, wherein each of the plurality of fragments of image data are associated with a corresponding position within the image, the method further comprises determining a distance between a position of the unique identifier and a position of the registered phone number, and the unique identifier is determined as associated with the textual information when the position of the unique identifier is less than or approximately equal to a threshold distance from the position of the registered phone number.

7. The method of claim 6, wherein said verification and said retrieval steps are performed automatically in response to determining the unique identifier is associated with the registered phone number.

8. The method of claim 5, wherein the plurality of fragments of image data are also representative of other information indicative of the contact, wherein the unique identifier is determined to be associated with the registered phone number when the distance between the unique identifier and the registered phone number is less than the distance between the unique identifier and other information on the business card.

9. The method of claim 1, wherein the registered phone number is one of a telephone and mobile phone number associated with the contact.

10. The method of claim 1, wherein the retrieved contact information comprises data representative of at least the business card, wherein the user device is configured to generate and display an image of at least one of the business card and information included thereon.

11. The method of claim 1, wherein a memory of the device of the user stores contact information of the plurality of contacts in association with corresponding registered phone number, wherein each of the plurality of contact information comprises data representative of a corresponding business card, the method further comprises:
receiving an input from the user indicative of one of the corresponding registered phone number;
identifying the contact associated with the corresponding registered phone number and retrieving the associated contact information; and
displaying at least the retrieved contact information.

12. The method of claim 11, wherein the device of the user comprises a user interface from which the user interacts with the displayed contact information, wherein in response to a user interaction the business card associated with the contact information is generated and displayed on the device of the user.

13. The method of claim 11, wherein the user enters one of a telephone number or a mobile phone number into an input field.

14. A system configured to manage and retrieve contact information included on a plurality of business cards from a plurality of contacts of a user, the system comprising:
at least one memory storing instructions; and
at least one processor operably coupled to the memory and configured to execute instructions stored in the memory for performing a process of managing and retrieving contact information included on a plurality of business cards from a plurality of contacts of a user, the process comprising, for a given business card, of the plurality of business cards, that corresponds to a given contact of the user:
obtaining, by a device of the user, at least a unique identifier and a registered phone number from the business card;
determining, at a device of the user, the obtained unique identifier is associated with the registered phone number obtained from the business card;
verifying, by the device of the user, the contact corresponding to the business card is registered with a contact management server based on the determination that the obtained unique identifier is associated with the obtained registered phone number, wherein the contact management server comprises a database that stores contact information of the contact in association with a contact identifier comprising the registered phone number;
in response to said determining, generating a record locator comprising the obtained registered phone number by the device of the user, wherein the record locator does not include the obtained unique identifier;
retrieving, from the contact management server, the contact information of the contact based on locating the contact identifier comprising the registered phone number that matches the obtained registered phone number in the record locator; and storing, at the device of the user, the retrieved contact information in association with the obtained registered phone number.

15. The system of claim 14, wherein the unique identifier is a symbol indicative that the contact has been registered with the contact management server.

16. The system of claim 14, wherein the plurality of business cards each comprise the unique identifier as a common symbol indicative that the plurality of contacts have each registered with the contact management server.

17. The system of claim 14, wherein said determining is based in part on a position of the unique identifier on the business card in relation to a position of the registered phone number on the business card.

18. The system of claim 14, further comprising an image capture device that captures an image of the business card using a camera, the image data comprising image data representative of the business card, wherein the at least one memory stores the image data and the process further comprises:

processing the image data to identify a plurality of fragments of image data representative of at least the registered phone number and the unique identifier; and extracting the registered phone number and the unique identifier.

19. The system of claim 14, further comprising a display, wherein the at least one memory stores contact information of the plurality of contacts in association with corresponding registered phone number, wherein each of the plurality of contact information comprises data representative of a corresponding business card, the process further comprises:

receiving an input from the user indicative of one of the corresponding registered phone numbers;

identifying the contact associated with the corresponding registered phone number and retrieving the associated contact information; and displaying at least the retrieved contact information via the display.

20. A non-transitory computer readable medium having stored therein a program for making a computer execute a method of managing and retrieving contact information included on a plurality of business cards from a plurality of contacts of a user, the method comprising:

for a given business card, of the plurality of business cards that corresponds to a given contact of the user:

obtaining, by a device of the user, at least a unique identifier and a registered phone number from the business card;

determining, at a device of the user, the obtained unique identifier is associated with the registered phone number obtained from the business card;

verifying, by the device of the user, the contact corresponding to the business card is registered with a contact management server based on the determination that the obtained unique identifier is associated with the obtained registered phone number, wherein the contact management server comprises a database that stores contact information of the contact in association with a contact identifier comprising the registered phone number;

in response to said determining, generating a record locator comprising the obtained registered phone number by the device of the user, wherein the record locator does not include the obtained unique identifier;

retrieving, from the contact management server, the contact information of the contact based on locating the contact identifier comprising the registered phone number that matches the obtained registered phone number in the record locator; and storing, at the device of the user, the retrieved contact information in association with the obtained registered phone number.

21. The method of claim 1, wherein the record locator comprises only the obtained registered phone number.

22. The method of claim 1, wherein the unique identifier is a common unique identifier included on each business card of the plurality of business cards.

* * * * *